United States Patent
Yano

(10) Patent No.: US 7,408,146 B2
(45) Date of Patent: Aug. 5, 2008

(54) SIGNAL LIGHT TRANSMITTING APPARATUS, SIGNAL LIGHT TRANSMITTING SYSTEM USING THE SAME, AND SIGNAL LIGHT TRANSMITTING METHOD

(75) Inventor: Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 310 days.

(21) Appl. No.: 11/392,509

(22) Filed: Mar. 30, 2006

(65) Prior Publication Data

US 2006/0219878 A1 Oct. 5, 2006

(30) Foreign Application Priority Data

Mar. 31, 2005 (JP) ............................. 2005-105306

(51) Int. Cl.
*H01S 3/00* (2006.01)
(52) U.S. Cl. ................. 250/227.11; 359/334; 359/341.3
(58) Field of Classification Search ............ 250/277.11; 359/334, 337.13, 341.1, 341.3; 398/37, 38, 398/94, 197; 356/73.1
See application file for complete search history.

(56) References Cited

U.S. PATENT DOCUMENTS

| | | | |
|---|---|---|---|
| 6,128,111 A | 10/2000 | Roberts | |
| 6,483,617 B1 | 11/2002 | Roberts | |
| 6,512,628 B1 | 1/2003 | Terahara et al. | |
| 6,738,132 B2 * | 5/2004 | Sobe et al. | 356/73.1 |
| 6,862,134 B2 | 3/2005 | Terahara et al. | |
| 7,136,559 B2 * | 11/2006 | Yusoff et al. | 385/125 |
| 7,158,285 B2 * | 1/2007 | Yoshida | 359/334 |
| 7,239,441 B2 * | 7/2007 | Yoshida | 359/337.12 |
| 2003/0090780 A1 * | 5/2003 | Sobe et al. | 359/334 |
| 2004/0246568 A1 * | 12/2004 | Onaka et al. | 359/337 |
| 2005/0105167 A1 * | 5/2005 | Martinelli et al. | 359/334 |
| 2005/0213196 A1 * | 9/2005 | Ishikawa et al. | 359/334 |
| 2006/0219878 A1 * | 10/2006 | Yano | 250/227.11 |

FOREIGN PATENT DOCUMENTS

| | | |
|---|---|---|
| JP | 10-233736 | 9/1998 |
| JP | 2856435 | 11/1998 |
| JP | 2001-251006 | 9/2001 |
| JP | 3578343 | 7/2004 |

OTHER PUBLICATIONS

Aoki, "Properties of Fiber Raman Amplifiers and Their Applicability to Digital Optical Communication Systems," Journal of Lightwave Technologies, vol. 6, No. 7, Jul. 1988, pp. 1225-1239.
Mochizuki et al., "Amplified Spontaneous Raman Scattering in Fiber Raman Amplifiers," Journal of Lightwave Technologies, vol. LT-4, No. 9, Sep. 1986, pp. 1328-1333.
Tkach et al., "Spontaneous Brillouin Scattering For Single-Mode Optical-Fibre Characterization," Electronics Letters, vol. 22, No. 19, Sept. 11, 1986, pp. pp. 1011-1013.

* cited by examiner

*Primary Examiner*—John R Lee
(74) *Attorney, Agent, or Firm*—Foley & Lardner LLP

(57) ABSTRACT

A signal light transmitting apparatus from which signal light is led into a transmission optical fiber, the transmission optical fiber transmitting the led signal light, includes: a signal light power changer which changes power of signal light led thereto, the changed signal light being led into the transmission optical fiber therefrom; a scattering pump light source which emits scattering pump light producing scattered light in the transmission optical fiber; a scattered light power measure which measures the power of the produced scattered light; and a controller which controls the signal light power changer based on the measured power of the scattered light.

23 Claims, 13 Drawing Sheets

SIGNAL LIGHT TRANSMITTING APPARATUS, SIGNAL LIGHT TRANSMITTING SYSTEM USING THE SAME, AND SIGNAL LIGHT TRANSMITTING METHOD

CROSS-REFERENCE TO RELATED APPLICATION

This application is based upon and claims the benefit of priority from the prior Japanese Patent Application No. 2005-105306, filed Mar. 31, 2005, the entire contents of which are incorporated herein by reference.

BACKGROUND OF THE INVENTION

1. Field of the Invention

The present invention relates to a signal light transmitting apparatus which transmits signal light, a signal light transmitting system using the same, and a signal light transmitting method.

2. Description of the Related Art

Optimization of Power of Signal Light Which Enters Transmission Optical Fiber

In signal light transmitting system using transmission optical fiber, to secure a certain transmission quality, it is necessary that power of signal light which enters transmission optical fiber be greater than a predetermined lower limit. Signal light transmitted with transmission optical fiber is amplified by optical amplifier of repeater office. The lower limit is determined by amount of accumulation of optical noise (degree of depression of optical SNR) produced when amplifying signal light. The lower power of signal light which enters into transmission optical fiber from optical amplifier is, the more strongly signal light deteriorates.

It is known that transmission quality deteriorates through nonlinear optical effect occurring in transmission optical fiber during transmission of signal light. There are several types of phenomena which nonlinear optical effect causes. For example, there is phenomenon in which phase of signal light which propagates through transmission optical fiber is modulated. The phenomenon is caused by change of refractive index of transmission optical fiber depending on strength of power of signal light. GVD (Group Velocity Dispersion) of transmission optical fiber transforms phase modulation into intensity modulation to cause waveform distortion. The higher power of signal light in an optical fiber is, the more strongly the deterioration of signal light through nonlinear optical effect occurs. Accordingly, to secure a certain transmission quality, it is necessary that power of signal light which enters transmission optical fiber be less than a predetermined upper limit.

As mentioned above, it turns out that an optimum value of entrance power of signal light entering transmission optical fiber exists. Transmission quality of signal light transmitting system can be represented by Bit Error Rate (BER). When entrance power is too much, BER decreases through nonlinear optical effect. When entrance power is too little, optical SNR is depressed to decrease BER too. It is required that trade-off between both should be easily redressed.

Signal light transmitting system is designed so that gap between the upper limit and the lower limit of entrance power is enlarged enough. Optimum value in which BER is maximized exists between the upper limit and the lower limit. When value of entrance power is made higher than the optimum value, BER decreases. At this time, nonlinear optical effect occurs significantly. Alternatively, when entrance power is made less than the optimum value, optical SNR is depressed to decrease BER. Generally, value of entrance power is set at the value which does not exceed the optimum value, so that nonlinear optical effect may not occur significantly. That is, entrance power is set so that real value of entrance power is less than the value of entrance power, in which nonlinear optical effect occurs significantly, by a predetermined allowable value. During transmission of signal light, transmission loss which decreases power of signal light occurs. When signal light transmitting system is operated and maintained for a long period of time, transmission loss could increase and optical SNR could be depressed. For this reason, the allowable value is made as little as possible. Long-term deterioration of transmission optical fiber, increase in connection point of transmission optical fiber, and so on, increase transmission loss. The connection point of the transmission optical fiber is newly provided, when transmission optical fiber is cut in an accident.

Individual Optimization of Entrance Power

In a representative signal light transmitting system, several repeater offices and transmission optical fibers are used. Transmission line which transmits signal light is divided into several transmission sections by repeater offices. Optimum values of powers of signal lights which enter transmission optical fibers in transmission sections, respectively, are distinct from each other. There are two main reasons.

A variety of optical fibers is used for representative main transmission network. Probability of nonlinear optical effect occurring in optical fiber depends on parameters of the optical fiber, such as mode field diameter (core diameter) and amount of $GeO_2$ doped in the optical fiber. When the type of the transmission optical fiber used for one transmission section differs from the one of the transmission optical fiber used for another transmission section, probabilities of nonlinear optical effect occurring in the transmission optical fibers differ from each other. This is the first reason. Parameters of optical fibers which distinct manufacturers manufacture are distinct from each other. Further, parameters of optical fibers manufactured at distinct manufacture periods are distinct from each other. Furthermore, the parameters of the optical fibers included in one manufacture lot differ from the parameters of the optical fibers included in another manufacture lot.

Loss in office building occurs in repeater office building. Optical connector is intermediate between optical amplifier and transmission optical fiber. Loss in office building is mainly caused in optical connector. In a large-scale repeater office, a large number of optical connectors are intermediate between the room in which the optical amplifier is installed and transmission optical fiber, and the loss in the office building could amount to several decibels. It is difficult to distinguish loss in office building and section loss caused between repeater offices. Loss in office building and section loss are treated as one.

Signal light which enters into transmission optical fiber from optical amplifier in office building is attenuated by loss in the office building. The phenomenon through the nonlinear optical effect which occurs when there is loss in office building occurs strongly compared with the case where it is assumed that there is not loss in office building. That is, it seems that probability of nonlinear optical effect occurring became lower. Because it is difficult to know loss in office building as mentioned above, it is difficult to know degrees of attenuations of signal lights caused in repeater offices, respectively. This is the second reason.

Jpn. Pat. No. 2856435 discloses the art of optimization of power of Raman pump light used for distributed Raman amplification. Loss distribution of transmission line is measured using OTDR, and power of Raman pump light is optimized so that ideal loss distribution is realized. Although optimum values of powers of pump lights transmitted in transmission sections are calculated, respectively, entrance powers of signal lights which enter optical fibers is fixed, respectively. Each of entrance powers of signal lights is kept at a certain constant ideal value. The state of each transmission section is not considered not to optimize each entrance power.

Jpn. Pat. KOKAI Publication No. 2001-251006 discloses the art of optimization of entrance power of signal light which enters optical fiber and power of Raman pump light used for distributed Raman amplification. The application on which U.S. Pat. No. 6,512,628 was based was filed based on Jpn. Pat. KOKAI Publication No. 2001-251006. The state of each transmission section is not considered not to optimize each entrance power, but each entrance power is adjusted so that the value of each entrance power become optimum value calculated beforehand. Additionally, the art of obtaining loss of the whole transmission line based on remains power of Raman pump light transmitted to opposite office is disclosed in the publication. Power of Raman pump light is adjusted in accordance with the loss of the whole transmission line. Although the loss of the whole transmission line can be obtained, localized loss, such as loss in office building is undistinguishable from the loss of the whole transmission line. Jpn. Pat. KOKAI Publication No. 10-233736 (filed based on the application on which U.S. Pat. No. 6,128,111 was based) discloses the art of optimization of entrance power of signal light entering transmission optical fiber based on amount of occurrence of Four-wave mixing (FWM) in transmission-line fiber. FWM is one of the phenomena caused through nonlinear optical effect. The amount of occurrence of FWM can be used as indicator for optimizing entrance power, because it is dependent on nonlinearity of transmission optical fiber. The amount of occurrence of FWM can be used as indicator indicates probability of nonlinear optical effect occurring, as long as phase matching condition, associated with frequency interval of light waves entering transmission optical fiber or GVD of transmission optical fiber, is satisfied and the polarization of each light wave takes the specified state. Entrance power can not be optimized unless phase matching condition is satisfied. When a large number of optical amplifiers are used, it is necessary to remove FWM light caused through FWM in each transmission section so that FWM light should not accumulate. When GVD of transmission optical fiber is higher, power of FWM light to cause becomes lower, and measurement of power of FWM light becomes difficult. For this reason, it is necessary to make entrance power extremely higher. It is difficult to optimize each entrance power.

Scattering Occurred in Optical Fiber

When light which enters optical fiber strikes the matter which the optical fiber is formed of, the light is dispersed and is said to be scattered. Scattering is classified into Rayleigh scattering, Raman scattering, Brillouin scattering, etc. depending on features of scattering. Rayleigh scattering originates from random density fluctuation fixed when glass gets cool and becomes solid. The scattered light and the entrance light have the same frequency.

Raman scattering is the scattering in which scattered light occurs by interaction of entrance light with molecular vibration or optical lattice vibration (optical phonon). Brillouin scattering is the scattering in which scattered light occurs by interaction of entrance light with acoustic lattice vibration (acoustic phonon). The difference between the frequency of the entrance light and the one of the scattered light (difference frequency) was decided. When Raman scattering or Brillouin scattering occurs, frequency of light shifts by the difference frequency (frequency shift). When power of incident light becomes higher, nonlinear coupling takes place between the entrance light and the scattered light. When the nonlinear coupling takes place, the lattice vibrates coherently at the difference frequency. It is known that stimulated emission of scattered light occurs at this time.

When stimulated Raman scattering occurs in optical fiber of silica glass, peak frequency which gives peak of spectrum of scattered light is lower than frequency of entrance light (pump light) by about 13 THz. Entrance light can be scattered in the forward direction in which entrance light propagates and the backward direction opposite to the forward direction. When stimulated Raman scattering occurs, peak frequency of scattered light is less than frequency of pump light by about 11 GHz. Entrance light is strongly scattered in only backward.

Stimulated Raman Scattering and Raman Amplification

When stimulated Raman scattering is used, light which enters optical fiber can be amplified. When signal light and Raman pump light which has higher frequency rather than frequency of signal light by about 13 THz simultaneously enter optical fiber of silica glass, portion of energy of the Raman pump light is transferred from the Raman pump light to the signal light via stimulated Raman scattering. As a result, signal light is amplified. This is called Raman amplification, and gain caused by Raman amplification is called Raman gain. Representative Raman gain has wavelength dependency as shown in FIG. 11. The transmission line formed from such optical fiber can be used as amplification medium (Distributed Raman Amplification).

Raman Gain Efficiency Measurement

Suppose that Raman gain (dB) occurs when pump light having a certain power (W) is input into optical fiber used as Raman amplification medium. Normalized variation of Raman gain (dB), obtained when changing pump light, by variation of power of pump light (W) is called Raman gain efficiency (dB/W).

Measurement of Raman gain efficiency is equivalent to measurement of Raman gain, when power of pump light is known. FIG. 12 shows a representative apparatus which measures Raman gain efficiency. The apparatus has devices 110, 120 and 510 for the measurement arranged at ends of the transmission line formed from optical fiber. Test light source 120 which emits test light is arranged on one end 312 side of transmission optical fiber 310 which connects two repeater offices 30. The wavelength of the test light is set up so that Raman gain efficiency is appropriately measured. Wavelength Division Multiplexing coupler (WDM coupler) 531 is arranged on the other end 311 side of transmission optical fiber 310. WDM coupler 531 can divide pump light and signal light, and WDM coupler 531 can make pump light and signal light overlap. Pump light source 110 is connected to pump wavelength range port 531a provided for WDM coupler 531, and measuring device 510 which measures the power of the test light amplified in transmission optical fiber 310 is connected to signal wavelength range port 531b provided for WDM coupler 531. In measurement of Raman gain efficiency, test light source 120, pump light source 110, and measuring device 510 are added to repeater office 30. It is necessary to modify optical system of repeater office 30 at the time of the addition.

First, the test light emitted by test light source 120 enters transmission optical fiber 310 at end 312, and power Pt1 (dBm) of the test light which is amplified in transmission optical fiber 310 and exits end 311 is measured. Pump light source 110 does not emit pump light during measurement of power Pt1. Subsequently, test light emitted by test light source 120 enters transmission optical fiber 310, with pump light emitted by pump light source 110, to measure power Pt2 (dBm) of the amplified test light. The emitted pump light enters transmission optical fiber 310 at end 311 via WDM coupler 531. Difference between Pt1 (dBm) and Pt2 (dBm) is Raman gain (dB) which test light obtains. When the power (W) of a pump light is changed, Raman gain (dB) changes. Normalizing variation of gain by variation of power of pump light, Raman gain efficiency (dB/W) is obtained.

Test light may enter transmission optical fiber 310 at end 311, test light may enter transmission optical fiber 310 at end 312, and pump light which is amplified in transmission optical fiber 310 and exits end 312 may be measured.

In the above-mentioned representative apparatus, it is necessary to operate at both ends of transmission line, and expensive test light source is required. Jpn. Pat. No. 3578343 to M. Sobe et al. discloses the art of measurement of power of Amplified Spontaneous Emission (ASE) light associated with Raman gain. According to the art, operation for the measurement is performed only on one end side of transmission line, without test light. It is not necessary to operate at both ends of transmission line.

Increase in Reflectance through Stimulated Brillouin Scattering

When pump light having narrow spectral line width enters optical fiber at one end, portion of the entering light is reflected in the optical fiber and the reflected light exits the one end. The reflected light includes the scattering light originating from backward Brillouin scattering. When the power of the entering pump light increases gradually and reaches a certain power Pc, reflectance (power of pump light/power of reflected light) can increase sharply (FIG. 13). This is increase in reflectance through stimulated Brillouin scattering. Frequency of light shifts slightly (by about 11 GHz).

Such phenomenon is disclosed in several publications, e.g., R. W. Tkach et al., "Spontaneous Brillouin Scattering for Single-mode optical-fibre characterisation", Electronics Letters, vol. 22, no. 19, pp. 1011-1013, September 1986, which is incorporated herein by reference. According to the publication, amount of frequency shift changes in accordance with amount of $GeO_2$ doped in optical fiber etc., and ranges from about 10.6 GHz to about 11.3 GHz.

As mentioned above, in order to acquire high transmission quality, it is desirable to make entrance power of signal light which enters transmission optical fiber higher as long as nonlinear optical effect dose not occur significantly. The entrance power in which nonlinear optical effect starts to occur significantly in one transmission section differs from that in which nonlinear optical effect starts to occur significantly in another transmission section. The art of obtaining each entrance power easily is not known.

The art in which light is observed only in terminal office to estimate transmission quality is known. However, when probabilities of nonlinear optical effect occurring in transmission sections are distinct from each other, it is difficult to obtain the entrance power for each transmission section in which nonlinear optical effect starts to occur significantly, from the observation result obtained only in terminal office.

Generally, when nonlinear optical effect is likely to occur (i.e., when the entrance power in which nonlinear optical effect starts to occur significantly is low), entrance power is set up lower. When probability of nonlinear optical effect occurring is unknown, entrance power is set up relatively lower. As long as the entrance power is set up relatively lower, when real probability of nonlinear optical effect occurring is higher, nonlinear optical effect is not likely to occur.

As mentioned above, it is difficult to know degrees of attenuations of signal lights caused from loss in repeater office buildings, respectively. In order to compensate the attenuation caused from loss in office building, output power of signal light which optical amplifier outputs is enlarged by amount of the attenuation. When loss in office building is low, output power is reduced. When loss in office building is unknown, output power is set up relatively lower. In the case that output power is set up relatively low, when real loss in office building is lower, it is prevented that entrance power of signal light which enters transmission optical fiber becomes unexpectedly high and the entrance power exceeds the power in which nonlinear optical effect starts to occur significantly.

Accordingly, when value of entrance power in which nonlinear optical effect starts to occur significantly and loss in office building are unknown, output power of signal light which optical amplifier outputs must be low.

BRIEF SUMMARY OF THE INVENTION

A signal light transmitting apparatus from which signal light is led into a transmission optical fiber, the transmission optical fiber transmitting the led signal light, comprises:

a signal light power changer which changes power of signal light led thereto, the changed signal light being led into the transmission optical fiber therefrom;

a scattering pump light source which emits scattering pump light producing scattered light in the transmission optical fiber;

a scattered light power measure which measures the power of the produced scattered light; and a controller which controls the signal light power changer based on the measured power of the scattered light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate exemplary embodiments of the invention, and together with the general description given above and the detailed description of the exemplary embodiments given below, serve to explain the principles of the invention.

DETAILED DESCRIPTION OF THE EXEMPLARY EMBODIMENT

Obtaining Raman Gain Efficiency

Raman gain efficiency can represent probability of nonlinear optical effect occurring. Obtaining Raman gain efficiency, power of signal light which enters transmission optical fiber can be optimized.

Figure 14:
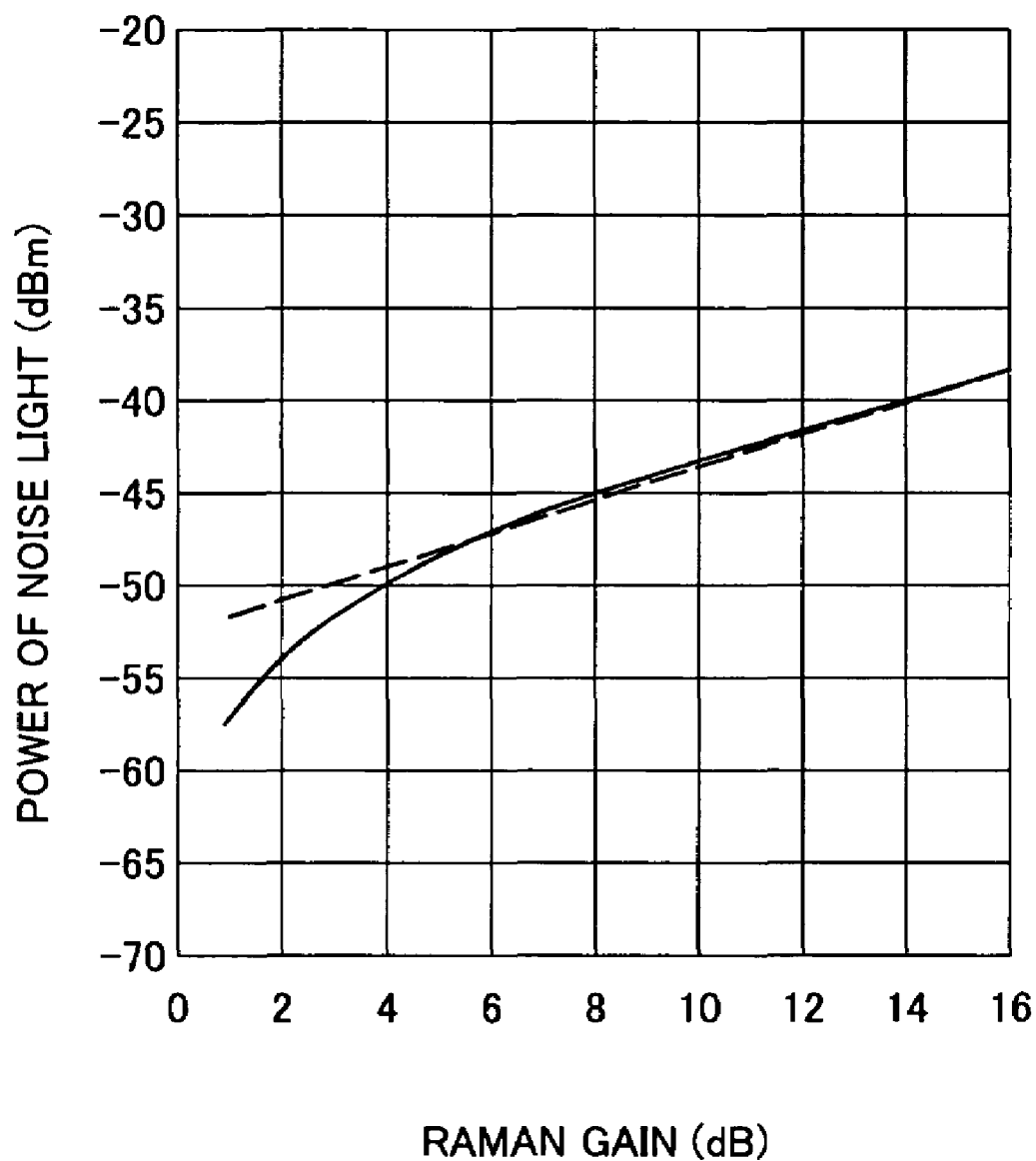
FIG. 14 is a graph of power (dBm) of noise light plotted against Raman gain (dB).

Jpn. Pat. No. 3578343, registered Jul. 23, 2004, discloses the art of obtaining Raman gain efficiency. U.S. Pat. Application Publication No. US 2003/0090780A1 was published May 15, 2003 based on the application on which Jpn. Pat. No. 3578343 was based. U.S. Pat. Application Publication No. US 2003/0090780A1 and Jpn. Pat. No. 3578343 are incorporated herein by reference. Kiyofumi Mochizuki, Noboru Edagawa and Yoshinao Iwamoto, "Amplified Spontaneous Raman Scattering in Fiber Raman Amplifiers", Journal of Lightwave Technology, vol. LT-4, no. 9, pp. 1328-1333 September 1986 as well as Yasuhiro Aoki, "Properties of Fiber Raman Amplifiers and Their Applicability to Digital Optical Communication Systems", Journal of Lightwave Technology, vol. 6, no. 7, pp. 1225-1239 July 1988, which is referred to in U.S. Pat. Application Publication No. US 2003/0090780A1 and Jpn. Pat. No. 3578343, are incorporated herein by reference. When pump light enters optical fiber so that Raman scattering occurs, scattered light including noise light occurs. According to Jpn. Pat. No. 3578343, under certain conditions it can be considered that power (dBm) of noise light is proportional to Raman gain (dB). The curve (solid line) on the graph in FIG. 14 shows the relation between Raman gain (dB) and power (dBm) of noise light. The curve in FIG. 14 is obtained under the same conditions as the curve drawn as solid line on the graph in FIG. 9 of Jpn. Pat. No. 3578343 is obtained under. In the case of FIG. 14, backward Raman scattering occurs. When Raman gain is greater than or equal to 3 dB, the curve becomes linear (dashed line). That is, it can be considered that power (dBm) of noise light is proportional to Raman gain (dB).

Jpn. Pat. No. 3578343 discloses the relation between noise light power variation $\Delta N$ (dB/W) and Raman gain efficiency $\Gamma$ (dB/W), shown in the following.

$$\Gamma = A * \Delta N + B \quad \text{(Formula 1)}$$

Noise light power variation $\Delta N$ (dB/W) is variation of power (dB) of noise light normalized by variation (W) of power of pump light. Coefficients A and B of one optical fiber are equal to coefficients A and B of another optical fiber. That is, coefficients A and B are invariable if one optical fiber is exchanged another optical fiber. When coefficients A and B are known beforehand, $\Gamma$ of each optical fiber can be obtained by obtaining $\Delta N$ of the optical fiber.

As mentioned above, in order to obtain Raman gain efficiency it is necessary to operate at both ends of transmission line formed from optical fiber and expensive test light source is required. When coefficients A and B are known beforehand, there is no such necessity.

Figure 1:
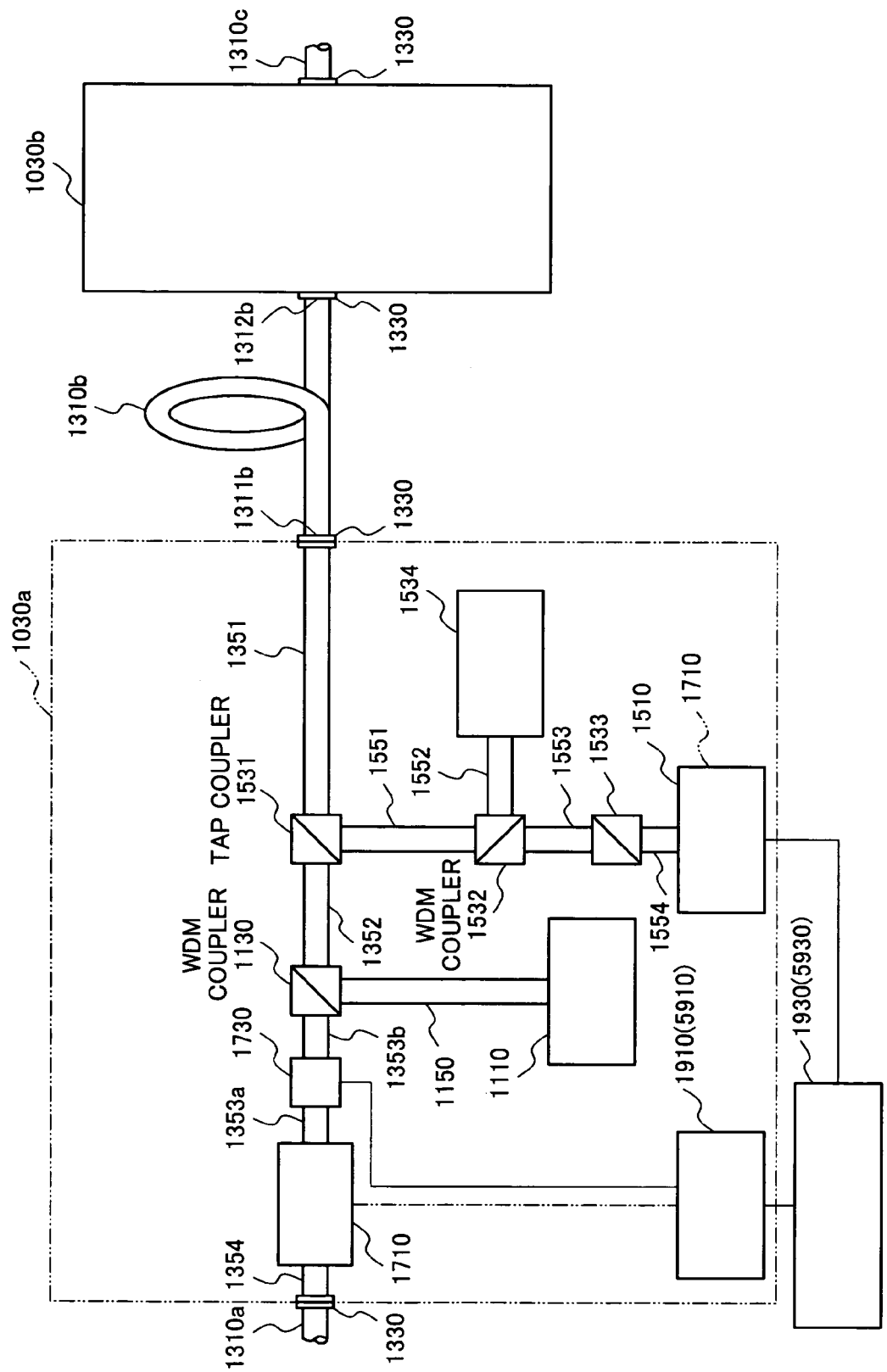
FIG. 1 is a schematic view showing a configuration of a signal light transmitting apparatus according to a first example, and a part of a configuration of a signal light transmitting system.
Figure 2:
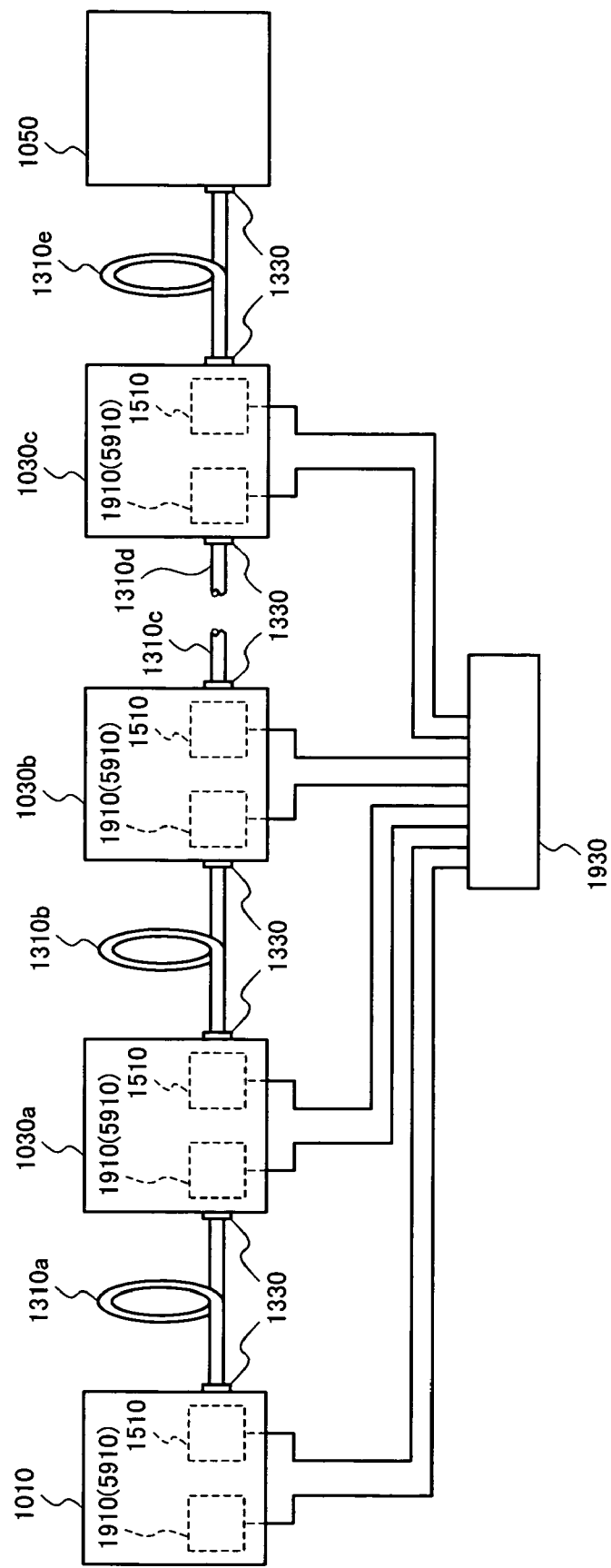
FIG. 2 is a schematic view showing a configuration of the signal light transmitting system.

FIG. 1 and FIG. 2 show a configuration of a signal light transmitting apparatus according to a first example, and a configuration of a signal light transmitting system using the signal light transmitting apparatus, respectively. Signal light which original office 1010 exits is sequentially amplified in a plurality of repeater offices 1030a, 1030b, and 1030c, and reaches terminal office 1050. The signal light transmitting system may have only one repeater office. The signal light transmitting system may have no repeater office. In this case, signal light amplified in original office is transmitted by transmission optical fiber, and reaches terminal office original office 1010, repeater offices 1030a, 1030b, and 1030c, as well as terminal office 1050 are connected to each other by transmission optical fiber 1310a, 1310b, 1310c, 1310d, and 1310e (FIG. 2). Each transmission optical fiber includes SMF. Each transmission optical fiber may include NZDSF of 1.55 μm dispersion-shifted fiber.

FIG. 1 shows part of the configuration shown in FIG. 2. Transmission optical fiber 1310a is connected to optical amplifier 1710 arranged in repeater office 1030a through optical connector 1330 and optical fiber 1354. Optical amplifier 1710 is included in a signal light power changer which changes power of signal light being led from transmission optical fiber 1310a. Optical amplifier 1710 includes at least one rare-earth-doped optical fiber amplifier. Preferably, optical amplifier 1710 includes at least one erbium-doped optical fiber amplifier (EDFA).

Transmission optical fiber 1310b has signal light entrance end 1311b and signal light exit end 1312b. Optical amplifier 1710 is connected to signal light entrance end 1311b of transmission optical fiber 1310b out of repeater office 1030a, through optical fiber 1353a, variable optical attenuator 1730, optical fiber 1353b, WDM coupler 1130, optical fiber 1352, TAP coupler 1531, optical fiber 1351, and optical connector 1330. TAP coupler 1531 includes a fiber-fused type coupler. TAP coupler 1531 may include a device which enables scattering pump light, signal light, and noise light to penetrate therethrough, and can divide each of the lights into by a desired dividing ratio. Preferably, TAP coupler 1531 includes a dielectric multilayered film type coupler. Signal light exit end 1312b is connected to repeater office 1030b through optical connector 1330. Transmission optical fiber 1310b transmits signal light which enters transmission optical fiber 1310b at signal light entrance end 1311b, to signal light exit end 1312b.

Signal light, having power which the signal light power changer changes, is led to the transmission optical fiber. The changed signal light enters transmission optical fiber 1310b at signal light entrance end 1311b. During signal transmission, signal light being transmitted to repeater office 1030a by transmission optical fiber 1310a, is amplified by optical amplifier 1710, is attenuated by variable optical attenuator 1730, penetrates WDM coupler 1130 and TAP coupler 1531, and then is transmitted to next repeater office 1030b by transmission optical fiber 1310b.

Scattering pump light generator 1110 is connected to WDM coupler 1130 through optical fiber 1150. Scattering pump light generator 1110 includes Fabry-Perot laser. The Fabry-Perot laser has fiber grating, and so laser beam emitted by the Fabry-Perot laser has narrow bandwidth. Scattering pump light generator 1110 may include a tunable laser which can output sufficient power. Scattering pump light generator 1110 is included in a scattering pump light source which emits scattering pump light. Most of scattering pump light which scattering pump light generator 1110 generates is reflected by WDM coupler 1130.

Most of signal light which enters WDM coupler 1130 from optical fiber 1353b penetrates WDM coupler 1130 and enters optical fiber 1352. Most of scattering pump light which enters WDM coupler 1130 from optical fiber 1150 is reflected by WDM coupler 1130 and enters optical fiber 1352. When wavelength of signal light is nearly equal to one of scattering pump light, an optical switch is provided instead of WDM coupler 1130. The reflected scattering pump light enters transmission optical fiber 1310b at signal light entrance end 1311b, and produces scattered light in transmission optical fiber 1310b. Scattering pump light generator 1110 generates scattering pump light so that scattered light produced in transmission optical fiber 1310b includes noise light. The produced noise light includes the light originating from backward Raman scattering.

Scattered light power measure 1510 which measures power of scattered light is connected to TAP coupler 1531 through optical fiber 1554, filter 1533, optical fiber 1553, WDM coupler 1532, and optical fiber 1551. Scattered light power measure 1510 includes a photodiode. Scattered light power measure 1510 may include a measuring device which can measure DC component of power of signal light. Preferably, scattered light power measure 1510 includes an avalanche photodiode, a calorimeter, or an optical power meter. WDM coupler 1532 includes a multilayered film type WDM coupler. WDM coupler 1532 may include a device which can remove scattering pump light and enable noise light to penetrate therethrough (optical filtering device). Preferably, WDM coupler 1532 includes a grating type wavelength filter, Fabry-Perot type wavelength filter, or Mach-Zehnder-interferometer type wavelength filter.

Scattered light, which is produced in transmission optical fiber 1310b and exits signal light entrance end 1311b, is reflected by TAP coupler 1531, penetrates WDM coupler 1532 and filter 1533, and then is led to scattered light power measure 1510. Filter 1533 includes a dielectric multilayered film type filter. Filter 1533 may include a device which can remove light other than scattered light and enable scattered light having sufficient power for measurement to penetrate therethrough (optical filtering device). Preferably, filter 1533 includes a grating type wavelength filter, Fabry-Perot type wavelength filter, or Mach-Zehnder-interferometer type wavelength filter. Most of scattering pump lights reflected in transmission optical fiber 1310b is reflected by TAP coupler 1531 and WDM coupler 1532, and then is led to optical terminator 1534 through optical fiber 1552. Controller (1910, 1930) controls the signal light power changer based on the power of the measured scattered light. The same members that are shown in FIG. 1 and arranged in repeater office 1030a, is arranged in each of other repeater offices 1030b and 1030c as well as original office 1010.

As mentioned above, when probability of nonlinear optical effect occurring of the transmission optical fiber is unknown, output power of signal light which optical amplifier outputs must be low. In the signal light transmitting apparatus, because probability of nonlinear optical effect occurring is obtainable based on the power of the measured scattered light, power of signal light which exits the signal light power changer including optical amplifier 1710 can be enlarged. Accordingly, transmission quality improves, and transmission distance can be increased.

Figure 12:
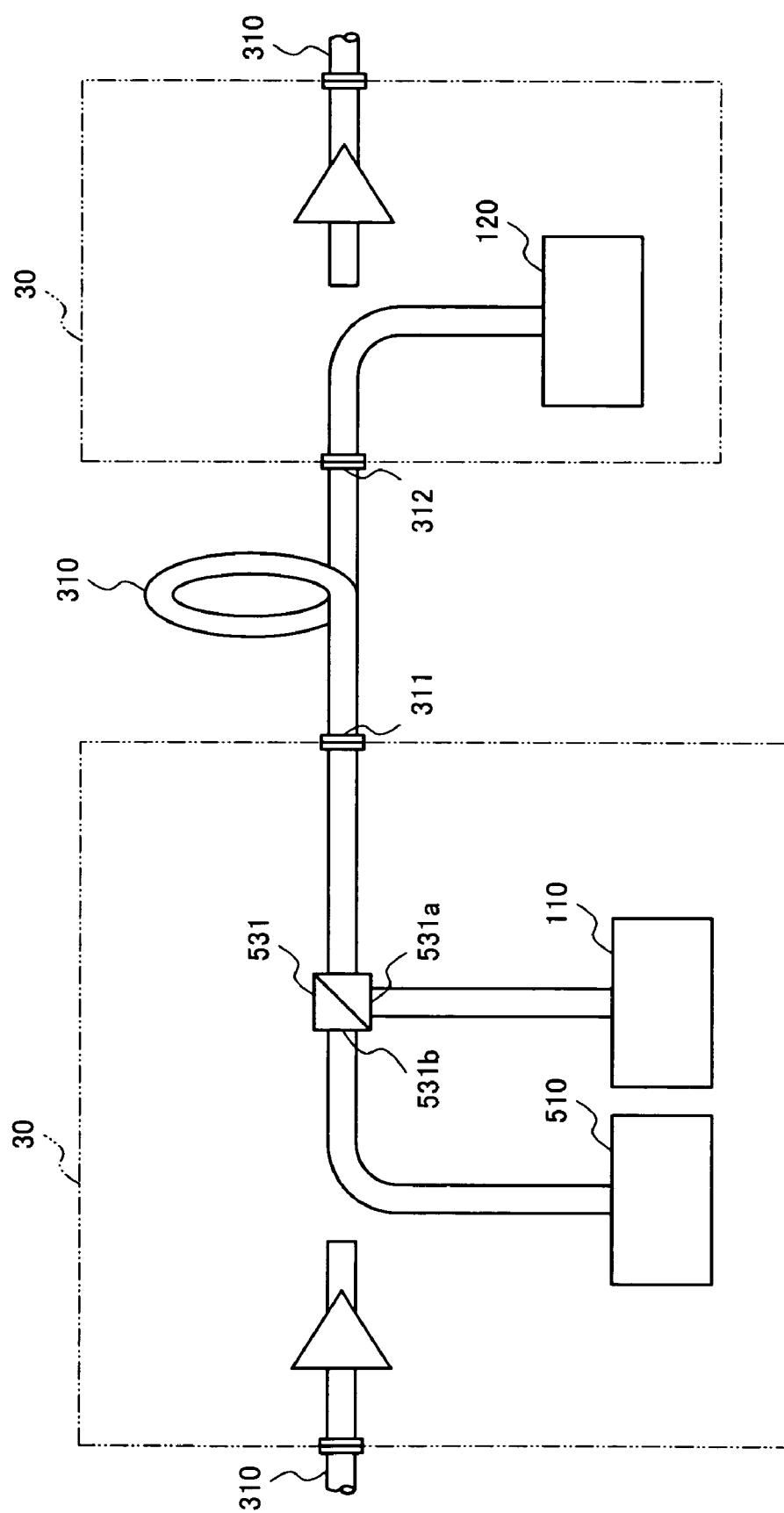
FIG. 12 is a schematic view showing a configuration of a representative apparatus which measures Raman gain efficiency.
Figure 13:
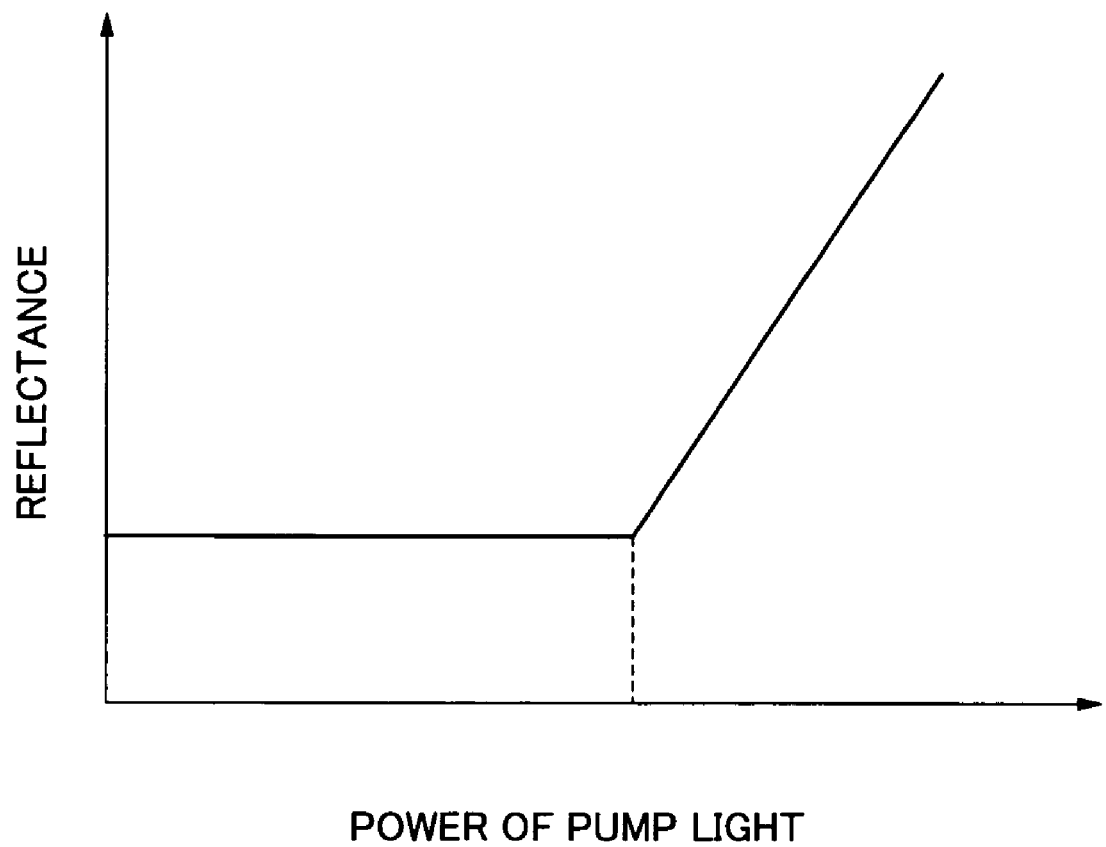
FIG. 13 is a graph of reflectance plotted against power of pump light, showing increase in reflectance through stimulated Brillouin scattering.

Because backward Raman scattering is utilized, scattering pump light generator 1110 and scattered light power measure 1510 can be arranged on signal light entrance end 1311b side of transmission optical fiber 1310b. Operation or maintenance of signal light transmitting apparatus is performed only on the one end side of transmission optical fiber 1310b. It is not necessary to perform operation or maintenance at both ends of transmission optical fiber 1310b. Unlike the above-mentioned representative apparatus (FIG. 12) which measures Raman gain efficiency, it is not necessary to modify optical system arranged in each repeater office and original office.

Signal light transmitting apparatus includes the signal light power changer including optical amplifier 1710 and variable optical attenuator 1730, the scattering pump light source including scattering pump light generator 1110, scattered light power measure 1510, as well as controller (1910, 1930).

The signal light transmitting apparatus is provided in each of repeater offices 1030a, 1030b, and 1030c as well as original office 1010. Signal light is led to the transmission optical fiber from the signal light transmitting apparatus. In FIG. 1, signal light is led to transmission optical fiber 1310b from the signal light transmitting apparatus provided in repeater office 1030a. One transmission optical fiber and one signal light-transmitting apparatus are included in a set. The signal light transmitting apparatus included in the set includes controller (1910, 1930). The signal light transmitting system includes a plurality of sets. The sets sequentially transmit signal light. The transmitted signal light is led to terminal office 1050 (FIG. 2). In addition, the signal light transmitting system includes targeted value setter 1930 which setting targeted values of powers of signal lights which exit the signal light power changers included in the sets, respectively, based on a series of powers of scattered lights which the scattered light power measures 1510 included in the sets measure, respectively. Each of scattered light power measures 1510 is connected to targeted value setter 1930.

Exit signal light controller 1910 which controls the signal light power changer provided in each of the repeater offices is arranged in the repeater office. Exit signal light controller 1910 is also arranged in original office 1010. Each exit signal light controller 1910 is connected to targeted value setter 1930.

Targeted value setter 1930 is included in the series of controllers (1910, 1930) included in the sets. That is, each of controllers (1910, 1930) include common targeted value setter 1930. Controllers (1910, 1930) include exit signal light controllers 1910, respectively. Exit signal light controllers

1910 control the signal light power changers, respectively, so that values of real powers of signal lights which exit the signal light power changers approaches the set targeted values, respectively.

Targeted value setter 1930 may set targeted value of power of signal light which exit at least one of the signal light power changers based on power of scattered light which at least one of the scattered light power measures 1510 measures.

Exit signal light controller 1910 may controls the signal light power changer so that value of power of signal light which exits the signal light power changer approaches the set targeted value.

Each signal light power changer includes variable optical attenuator 1730 which attenuates power of signal light amplified by optical amplifier 1710 included in the signal light power changer. Degree of attenuation of the signal light which passes through variable optical attenuator 1730 is variable. Variable optical attenuator 1730 is connected to exit signal light controller 1910. Exit signal light controller 1910 controls variable optical attenuator 1730 to vary the degree of attenuation. When the degree of attenuation is varied, power of signal light which exits the signal light power changer changes. When optical amplifier 1710 includes a plurality of rare-earth-doped optical fiber amplifiers connected in series, variable optical attenuator 1730 may be arranged between two adjacent rare-earth-doped optical fiber amplifiers.

The rare-earth-doped optical fiber amplifier included in optical amplifier 1710 includes a semiconductor laser diode which generates amplification pump light for amplification. In order to change power of signal light which exits the signal light power changer, exit signal light controller 1910 may controls the driving current of the semiconductor laser diode to change power of being generated amplification pump light. When power of amplification pump light is changed, power of signal light which exits the signal light power changer changes. Power of amplification pump light can be adjusted easily. In this case, variable optical attenuator 1730 is not needed.

When power of amplification pump light is changed, gain flatness may deteriorate. That is, the difference between the gain which the signal light having one wavelength obtains in amplifier and the gain which the signal light having another wavelength obtains may become relatively high. In using variable optical attenuator 1730, gain flatness does not deteriorate. However, when too much attenuation takes place, optical SNR is depressed. In order to prevent the depression, it is necessary to make gain of amplifier higher than loss originating from attenuation.

Scattering pump light generator 1110 can emit first scattering pump light and second scattering pump light having different power and the same wavelength, by turns. When scattering pump light generator 1110 emits first scattering pump light, first noise light is produced in transmission optical fiber 1310b (FIG. 1). The produced first noise light exits transmission optical fiber 1310b, and is led to scattered light power measure 1510. Scattered light power measure 1510 measures power NP1 (dBm) of the led first noise light. When scattering pump light generator 1110 emits second scattering pump light, second noise light is produced in transmission optical fiber 1310b. The produced second noise light exits transmission optical fiber 1310b, and is led to scattered light power measure 1510. Scattered light power measure 1510 measures power NP2 (dBm) of the led second noise light. Controller (1510, 1930) controls the signal light power changer based on a difference (NP1−NP2) (dB) between the measured power NP1 (dBm) of the first noise light and the measured power NP2 of the second noise light (dBm) Power NP1 (dBm) and NP2 (dBm) of the measured first and second noise light are influenced by connection loss generated in optical connector 1330. Difference (NP1−NP2) (dB) is not influenced by connection loss. Influence of connection loss is removed by utilizing difference (NP1−NP2) (dB). When first scattering pump light enters transmission optical fiber 1310b, transmission optical fiber 1310b can take a state of having first Raman gain G1 (dB). When second scattering pump light enters transmission optical fiber 1310b, transmission optical fiber 1310b can take a state of having second Raman gain G2 (dB). Controller (1510, 1930) obtains a difference (G1−G2) (dB) between first Raman gain G1 (dB) and second Raman gain G2 (dB) based on the difference (NP1−NP2) (dB), and controls the signal light power changer based on the obtained difference (G1−G2) (dB). Difference (G1−G2) (dB) is not influenced by the connection loss generated in optical connector 1330. The influence of the connection loss is removed by utilizing difference (G1−G2) (dB).

The signal light transmitting method which the signal light transmitting apparatus according to the first example utilizes, includes: a scattered light producing step of propagating scattering pump light through the transmission optical fiber which transmits signal light, so that scattered light is produced in the transmission optical fiber; a scattered light power measuring step of measuring the power of the produced scattered light; and a signal light adjusting step of adjusting power of signal light being led into the transmission optical fiber based on the measured power of the scattered light. The signal light transmitting method further includes a first scattering pump light power measuring step of measuring power $P_{pump}1$ (W) of first scattering pump light, and a second scattering pump light power measuring step of measuring power $P_{pump}2$ (W) of second scattering pump light.

Figure 3A:
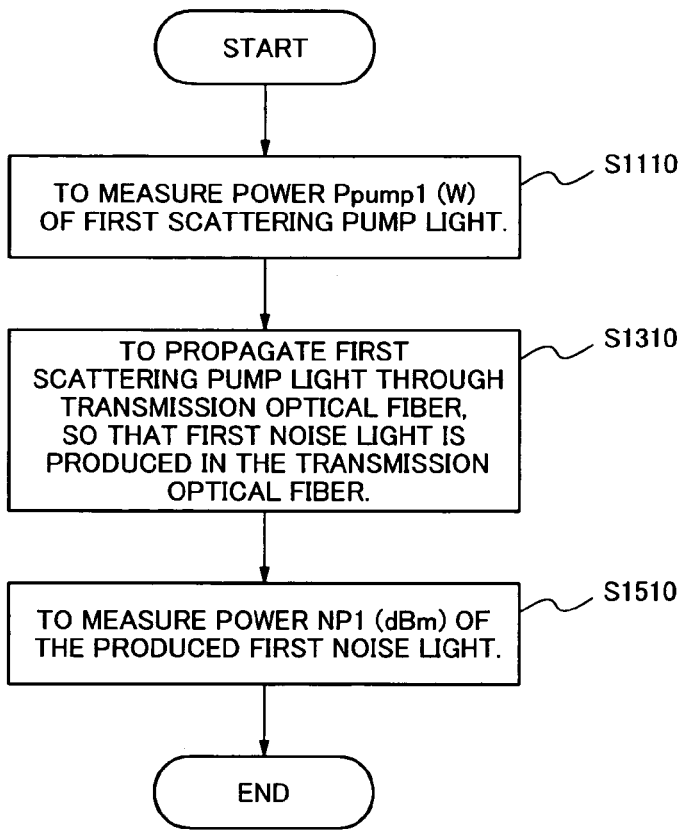
FIG. 3A is a flowchart of a first scattering pump light power measuring step, a first noise light producing step, and a first noise power light measuring step which are included in a signal light transmitting method according to the first example.

First, power $P_{pump}1$ (W) of first scattering pump light being led to the transmission optical fiber is measured (first scattering pump light power measuring step S1110 FIG. 3A). The led first scattering pump light propagates through the transmission optical fiber. The propagating first scattering pump light produces first noise light in the transmission optical fiber (first noise light producing step S1310). Power NP1 (dBm) of the produced first noise light is measured (first noise power light measuring step S1510).

Figure 3B:
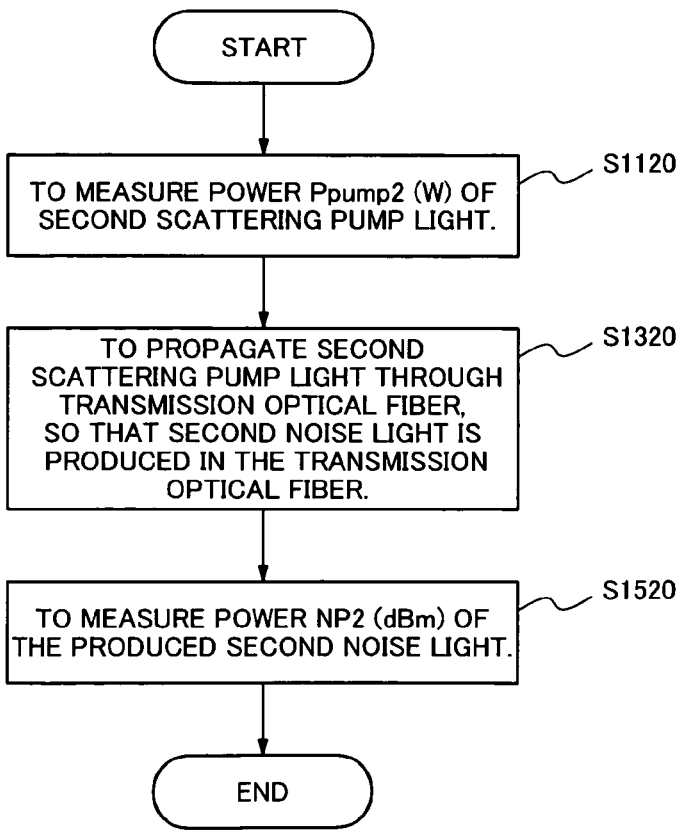
FIG. 3B is a flowchart of a second scattering pump light power measuring step, a second noise light producing step, and a second noise power light measuring step which are included in the signal light transmitting method.

Subsequently, power $P_{pump}2$ (W) of second scattering pump light being led to the transmission optical fiber is measured (second scattering pump light power measuring step S1120 FIG. 3B). The first and second scattering pump lights have different power and the same wavelength. The led second scattering pump light propagates through the transmission optical fiber. The propagating second scattering pump light produces second noise light in the transmission optical fiber (second noise light producing step S1320). Power NP2 (dBm) of the produced second noise light is measured (second noise power light measuring step S1520). The scattered light producing step includes first noise light producing step S1310 and second noise light producing step S1320. The scattered light power measuring step includes first noise power light measuring step S1510 and second noise power light measuring step S1520. The steps which are shown in FIG. 3A and FIG. 3B are carried out at each signal light transmitting apparatus.

Figure 4:
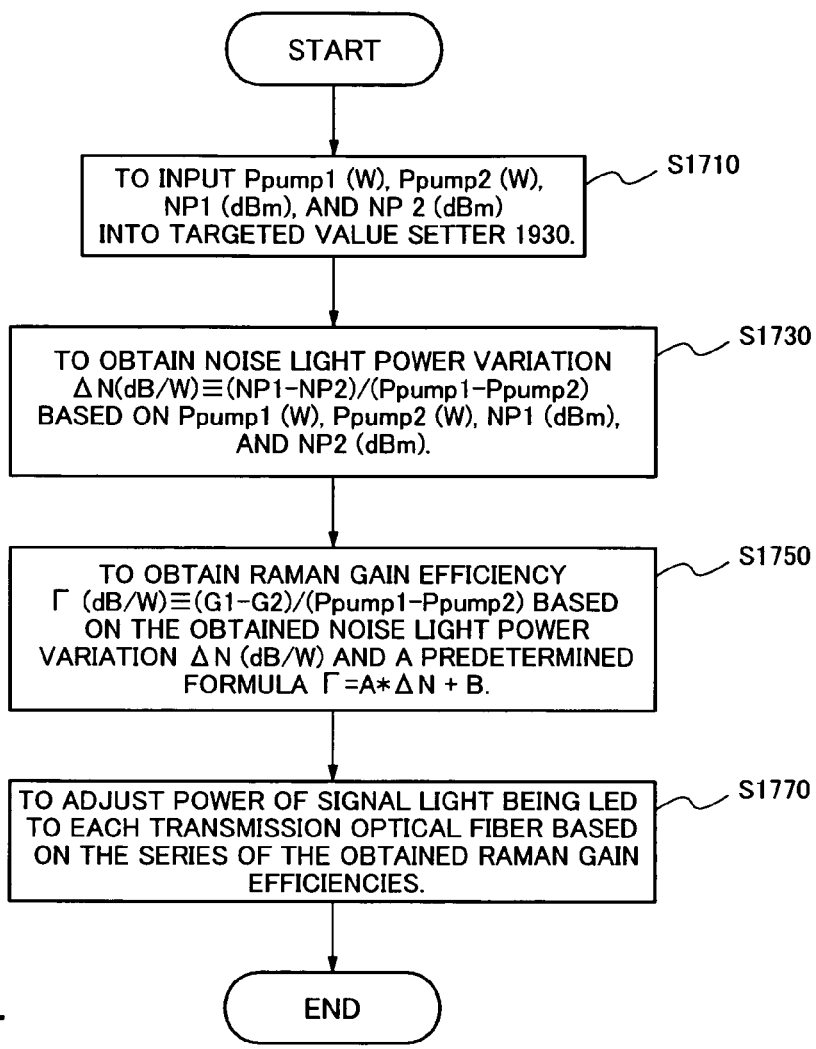
FIG. 4 is a flowchart of a signal light adjusting step included in the signal light transmitting method.

FIG. 4 shows the signal light adjusting step. The measured power $P_{pump}1$ (W) of the first scattering pump light, the measured power $P_{pump}2$ (W) of the second scattering pump light, the measured power NP1 (dBm) of the first noise light, and the measured power NP2 (dBm) of the second noise light are inputted into targeted value setter 1930 (power input step S1710). Targeted value setter 1930 obtains noise light power variation $\Delta N(dB/W) \equiv (NP1-NP2)/(P_{pump}1-P_{pump}2)$ based on $P_{pump}1$ (W), $P_{pump}2$ (W), NP1 (dBm), and NP2 (dBm) (noise light power variation obtaining step S1730). Targeted value setter 1930 obtains Raman gain efficiency $\Gamma$ (dB/W)$\equiv$ (G1−G2)/($P_{pump}1-P_{pump}2$) based on the obtained noise light power variation $\Delta N$ (dB/W) and a predetermined formula $\Gamma = A*\Delta N + B$ (Formula 1) (Raman gain efficiency obtaining step S1750). The scattering pump light source emits first and second scattering pump light so that G1 and G2 are greater than or equal to 3 dB.

Raman gain efficiencies are obtained through the sequence of above-mentioned steps for transmission optical fibers, respectively.

Targeted value setter 1930 and output signal light controller 1910 adjust power of signal light being led to each transmission optical fiber based on the series of the obtained Raman gain efficiencies (Raman-gain-efficiency signal light adjusting step S1770). The signal light adjusting step includes noise light power variation obtaining step S1730, Raman gain efficiency obtaining step S1750, and Raman-gain-efficiency signal light adjusting step S1770.

Figure 5:
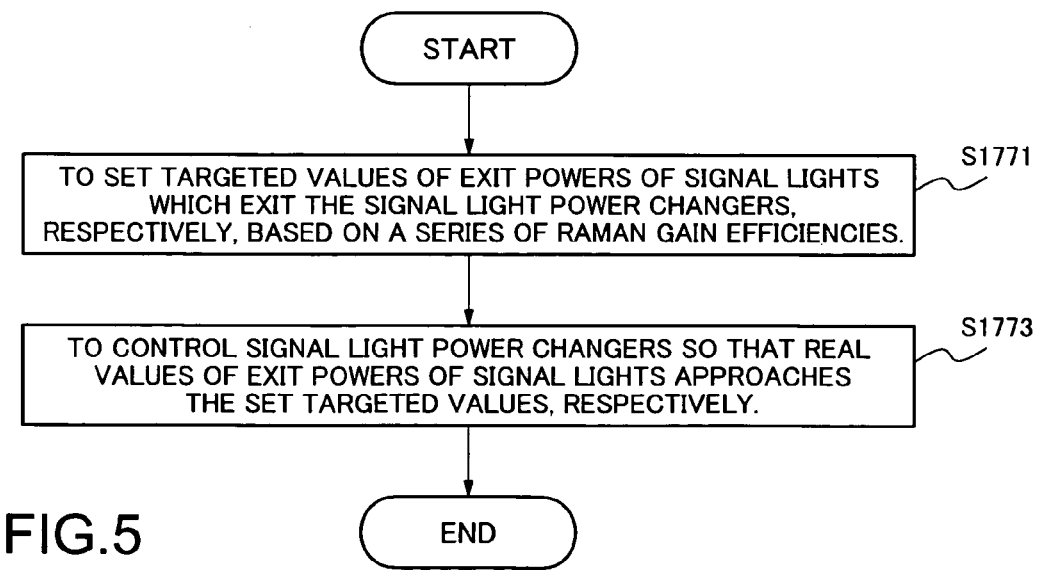
FIG. 5 is a flowchart of a Raman-gain-efficiency signal light adjusting step.

FIG. 5 shows Raman-gain-efficiency signal light adjusting step S1770. Raman-gain-efficiency signal light adjusting step S1770 includes targeted value setting step S1771 and exit signal light adjusting step S1773. Targeted value setter 1930 sets targeted values of exit powers of signal lights which exit the signal light power changers, respectively, based on a series of Raman gain efficiencies obtained for transmission optical fibers, respectively (targeted value setting step S1771). Exit signal light controllers 1910 control the signal light power changers, respectively, so that values of real exit powers of signal lights approaches the set targeted values, respectively (exit signal light adjusting step S1773).

Calculation formulae for calculating a series of targeted values are memorized in targeted value setter 1930. In targeted value setting step S1771, the series of the obtained Raman gain efficiencies $\Gamma$ (dB/W) and predetermined parameters are substituted into the calculation formulae to calculate a series of targeted values. A series of maxima of powers of signal lights which exit signal light power changers, respectively, is memorized in targeted value setter 1930. The maximum for each signal light power changer depends on gain of optical amplifier 1710 included in the signal light power changer. The targeted value for each signal light power changer is set at the value less than or equal to maximum for the signal light power changer.

A series of initial values of Raman gain efficiencies which are associated transmission optical fibers, respectively, is memorized in targeted value setter 1930. When transmission optical fiber is cut in accident, targeted value setter 1930 sets a series of targeted values based on the series of the initial values. After setting, when another series of Raman gain efficiencies is obtained, targeted value setter 1930 sets based on the obtained series of Raman gain efficiencies.

The initial value of Raman gain efficiency of each transmission optical fiber is calculated based on the parameters (mode field diameter, amount of $GeO_2$ doped in the transmission optical fiber, etc.) of the transmission optical fiber. In calculating the initial value for each transmission optical fiber, it is considered that the loss in office building which signal light is led to the transmission optical fiber from the office building is zero. Targeted values being set based on the series of the initial values which is calculated in this way are low. Accordingly, nonlinear optical effect is prevented from occurring significantly. The targeted value for each signal light power changer, which is obtained based on the calculated series of initial values of Raman gain efficiencies, is less than the targeted value for the signal light power changer, which is obtained based on the newly obtained series of Raman gain efficiencies, by the loss in the office building in which the signal light power changer is arranged.

The rare-earth-doped optical fiber amplifier included in optical amplifier 1710 includes a first reflected signal light power measure which measures power of signal light reflected in the transmission optical fiber during transmission of signal light. Scattered light power measure 1510 can include the first reflected signal light power measure. In this case, the first reflected signal light power measure can measure power of scattered light produced in transmission optical fiber. When optical amplifier 1710 includes C-band EDFA, signal light transmitting apparatus is set up so that scattered light power measure 1510 could measure the power of the light which has the wavelength included within C-band. Wavelength of scattering pump light which scattering pump light generator 1110 emits is set so that wavelength of being produced noise light is included within C-band. Because wavelength of noise light becomes less than wavelength of scattering pump light by about 13 THz, wavelength of scattering pump light is set at 1450 nm. When optical amplifier 1710 includes L-band EDFA, wavelength of scattering pump light is set at 1480 nm.

The signal light transmitting system could include a distributed Raman amplifier. The distributed Raman amplifier includes a Raman amplification pump light generator which generates Raman amplification pump light for distributed Raman amplification. Raman amplification pump light enters the transmission optical fiber, and is used for amplification of signal light. The distributed Raman amplifier includes a second reflected signal light power measure which measures power of signal light reflected in the transmission optical fiber during transmission of signal light.

The scattering pump light generator 1110 included in each signal light transmitting apparatus can include the Raman amplification pump light generator included in the signal light transmitting apparatus. That is, the scattering pump light generator can function as the Raman amplification pump light generator. When only Raman amplification pump light enters the transmission optical fiber, noise light is produced. Wavelength of being produced noise light is nearly equal to wavelength of signal light. Therefore, scattered light power measure 1510 can function as the second reflected signal light power measure. That is, scattered light power measure 1510 can include the second reflected signal light power measure. In this case, in order to generate scattering pump light, it is not necessary to prepare an additional generator, as well in order to measure noise light, it is not necessary to prepare an additional measuring device.

In the first example, scattering pump light enters transmission optical fiber 1310*b* at signal light entrance end 1311*b*, and scattered light which exits signal light entrance end 1311*b* is led to scattered light power measure 1510. The produced noise light includes the light originating from backward Raman scattering. Scattering pump light may enter transmission optical fiber 1310*b* at signal light exit end 1312*b*, and scattered light which exits signal light entrance end 1311*b* may be led to scattered light power measure 1510. The being produced noise light would include the light originating from forward Raman scattering. In this case, it is necessary to modify the optical system of the signal light transmitting system. Additionally, the nonlinearity on signal light entrance end 1311*b* side of transmission optical fiber 1310*b* needs to be nearly equal to the nonlinearity on signal light exit end 1312*b* side of transmission optical fiber 1310*b*.

Figure 6:
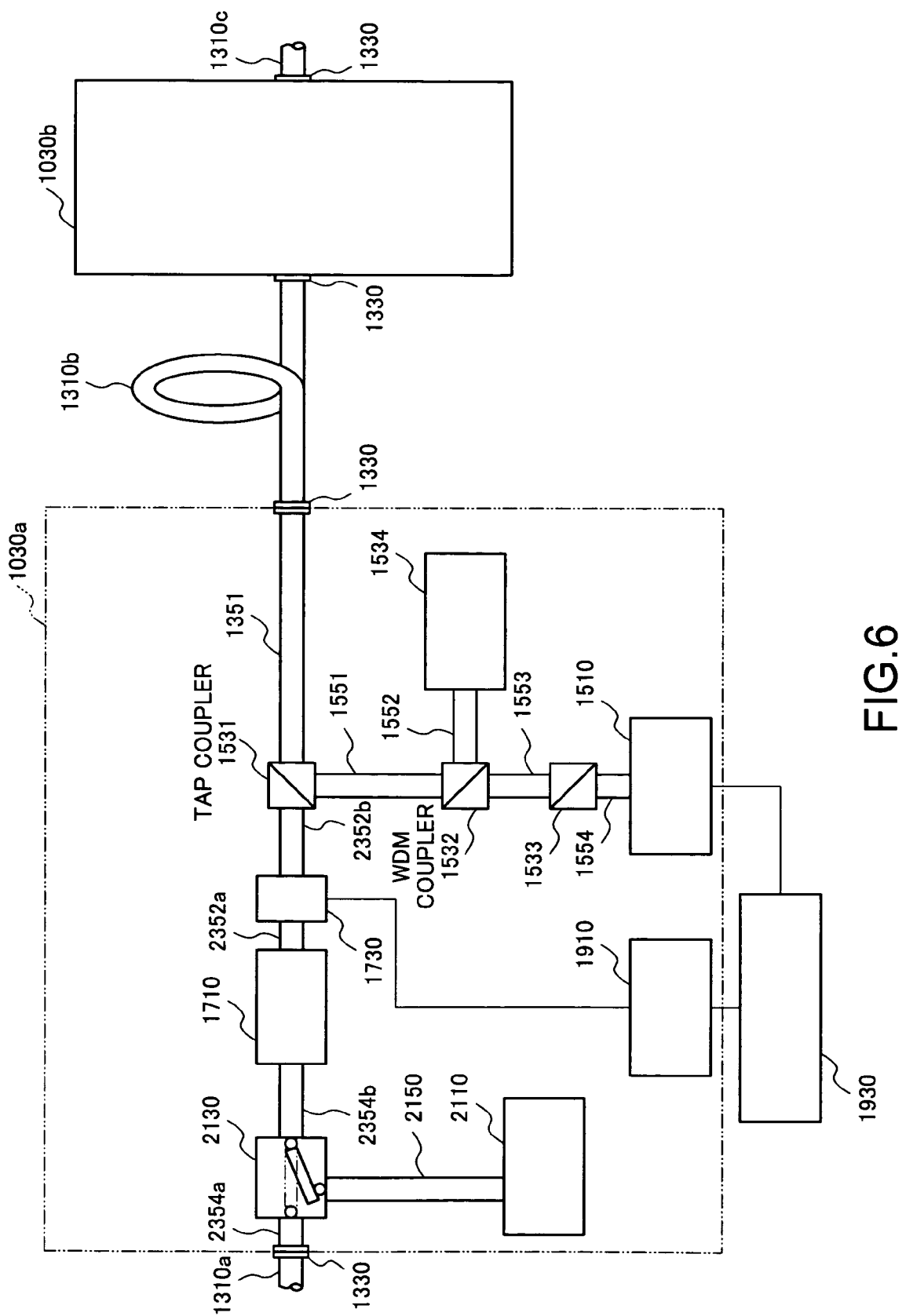
FIG. 6 is a schematic view showing a configuration of a signal light transmitting apparatus according to a second example.

FIG. 6 shows a configuration of a signal light transmitting apparatus according to a second example. The members that are designated by the same referential marks as designate the members of the first example have the same configurations as the members of the first example.

FIG. 6 shows part of the same configuration as shown in FIG. 2. A scattering pump light source included in the signal light transmitting apparatus according to the second example includes scattering pump light generator 2110 which generates scattering pump light, and optical amplifier 1710. Scattering pump light generator 2110 includes a semiconductor laser diode. Optical amplifier 1710 includes at least one rare-earth-doped optical fiber amplifier. A signal light power changer included in the signal light transmitting apparatus according to the second example includes optical amplifier 1710 and variable optical attenuator 1730. The scattering pump light source and the signal light power changer include optical amplifier 1710 in common. The signal light transmitting apparatus according to the second example further includes a signal light/scattering pump light selector which selectively leads one of signal light led to the signal light transmitting apparatus and scattering pump light generated with the scattering pump light generator 2110, to the optical amplifier 1710. The signal light/scattering pump light selector includes optical switch 2130.

Optical amplifier 1710 is connected to transmission optical fiber 1310*a* through optical fiber 2354*b*, optical switch 2130, optical fiber 2354*a*, and optical connector 1330. Scattering pump light generator 2110 is connected to optical switch 2130 through optical fiber 2150. Optical amplifier 1710 is connected to TAP coupler 1531 through optical fiber 2352*a*, variable optical attenuator 1730, and optical fiber 2352*b*.

When optical switch 2130 leads the generated scattering pump light to optical amplifier 1710, the optical amplifier 1710 amplifies the power of the led scattering pump light. The amplified scattering pump light is led into transmission optical fiber 1310*b*. The scattering pump light (seed light) having the relatively lower power emitted by the semiconductor laser diode is amplified by optical amplifier 1710. Thereby, the scattering pump light having sufficient power is obtained.

When optical switch 2130 leads signal light to optical amplifier 1710, optical amplifier 1710 amplifies power of the led signal light. The amplified signal light is led into transmission optical fiber 1310*b*. During this period, signal light is transmitted.

Figure 7:
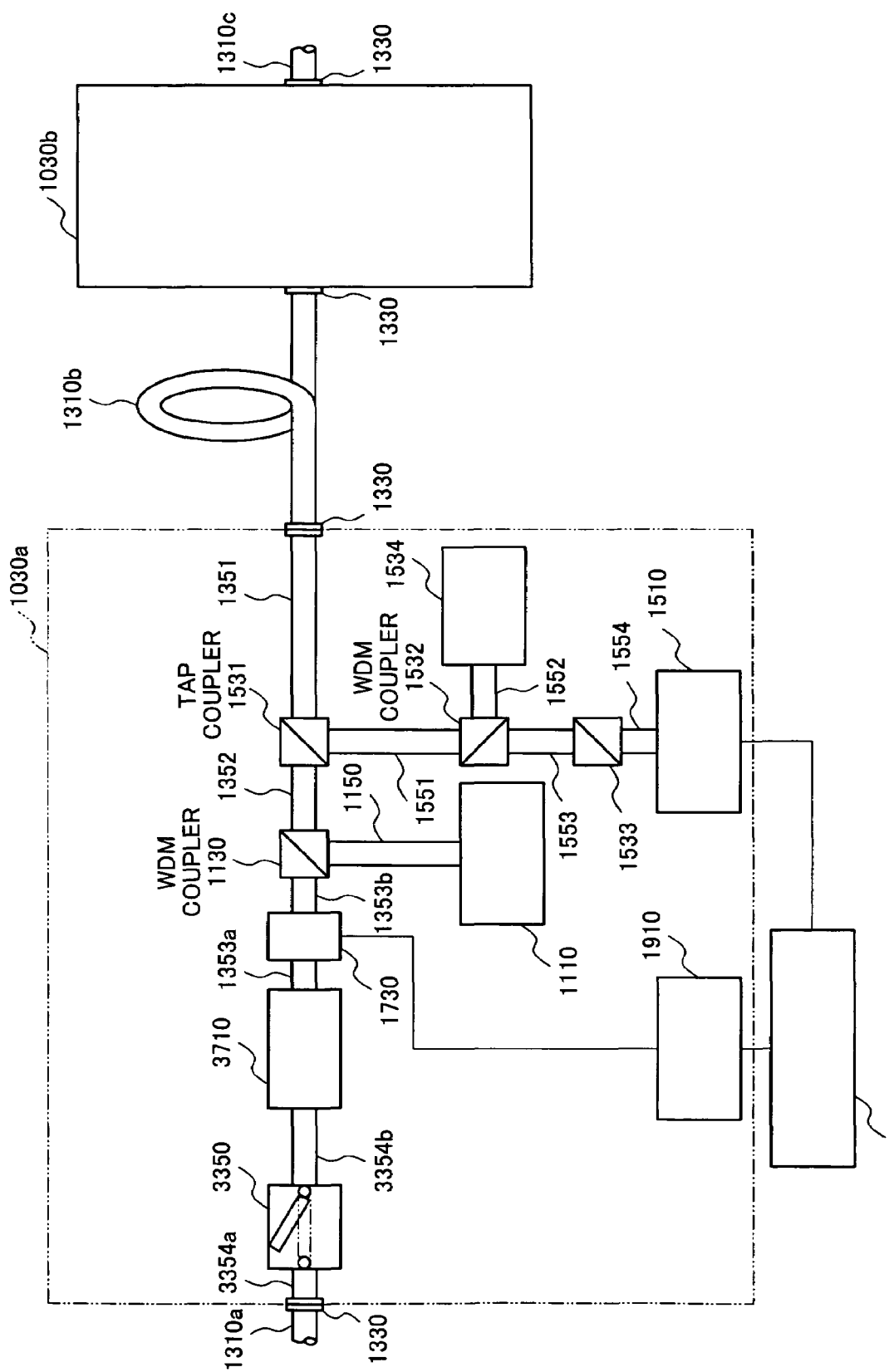
FIG. 7 is a schematic view showing a configuration of a signal light transmitting apparatus according to a third example.

FIG. 7 shows a configuration of a signal light transmitting apparatus according to a third example. The members that are designated by the same referential marks as designate the members of the first example have the same configurations as the members of the first example.

FIG. 7 shows part of the same configuration as shown in FIG. 2. The signal light transmitting apparatus according to the third example includes at least one rare-earth-doped optical fiber amplifier 3710. A signal light power changer and a scattering pump light source which are included in the signal light transmitting apparatus according to the third example include rare-earth-doped optical fiber amplifier 3710 in common. Rare-earth-doped optical fiber amplifier 3710 is connected to variable optical attenuator 1730 through optical fiber 1353*a*. Rare-earth-doped optical fiber amplifier 3710 is connected to transmission optical fiber 1310*a* through optical fiber 3354*b*, optical switch 3350, optical fiber 3354*a*, and optical connector 1330. The signal light power changer includes rare-earth-doped optical fiber amplifier 3710 and variable optical attenuator 1730.

Optical switch 3350 can take ON state which leads the signal light, led to the signal light transmitting apparatus from transmission optical fiber 1310*a*, to rare-earth-doped optical fiber amplifier 3710, and OFF state which intercepts the transmission of the signal light from transmission optical fiber 1310*a* to amplifier 3710. In ON state, rare-earth-doped optical fiber amplifier 3710 takes a signal light amplification state which the power of the signal light led to the signal light power changer is amplified. The amplified signal light is led into transmission optical fiber 1310*b*. In OFF state, rare-earth-doped optical fiber amplifier 3710 takes a spontaneous emission state of emitting amplified spontaneous emission light. In the spontaneous emission state, the amplified spontaneous emission light which rare-earth-doped optical fiber amplifier 3710 emits produces scattered light in transmission optical fiber 1310*b*. Amplified spontaneous emission light is used as scattering pump light which produces scattered light. In the signal light amplification state, signal light which rare-earth-doped optical fiber amplifier 3710 amplifies, is led into transmission optical fiber 1310*b*. Signal light is transmitted in the signal light amplification state.

In the same way as the first example, rare-earth-doped optical fiber amplifier 3710 includes the first reflected signal light power measure, and scattered light power measure 1510 can function as the first reflected signal light power measure. When rare-earth-doped optical fiber amplifier 3710 includes C-band EDFA, signal light transmitting apparatus is set up so that scattered light power measure 1510 can measure the power of the light which has the wavelength included within C-band. As mentioned above, scattered light power measure 1510 includes a photodiode. Light having the wavelength which is not included in C-band is removed from the light which is led to the photodiode from transmission optical fiber 1310*b*. For example, when filter 1533 is selected appropriately, the removal of the light would be carried out appropriately.

Wavelength of the scattering pump light, which the scattering pump light source according to the third example emits, is limited to the wavelength of amplified spontaneous emission light which rare-earth-doped optical fiber amplifier 3710 in the spontaneous emission state emits. Therefore, the wavelength of the noise light to produce is also limited. When rare-earth-doped optical fiber amplifier 3710 includes C-band EDFA, wavelength of noise light is not included in C-band, but is included in L-band SV. Therefore, the signal light transmitting apparatus is set up so that scattered light power measure 1510 can measure the power of the light which has the wavelength included within C-band or L-band SV. Light having the wavelength which is not included in C-band or L-band SV is removed from the light led to the photodiode. When the signal light transmitting apparatus is set up in this way, it is required for the signal light transmitting apparatus not to transmit the signal light which has the wavelength included within L-band.

When rare-earth-doped optical fiber amplifier 3710 includes L-band EDFA, wavelength of noise light measured by scattered light power measure 1510 becomes extremely long. Because it is difficult to measure such noise light, scattered light power measure 1510 cannot function as the first reflected signal light power measure.

In the same way as the third example, when optical amplifier 1710 included in the signal light transmitting apparatus according to the second example includes C-band EDFA, scattered light power measure 1510 can function as the first reflected signal light power measure. When optical amplifier 1710 included in the signal light transmitting apparatus according to the second example includes L-band EDFA, scattered light power measure 1510 cannot function as the first reflected signal light power measure.

Figure 8:
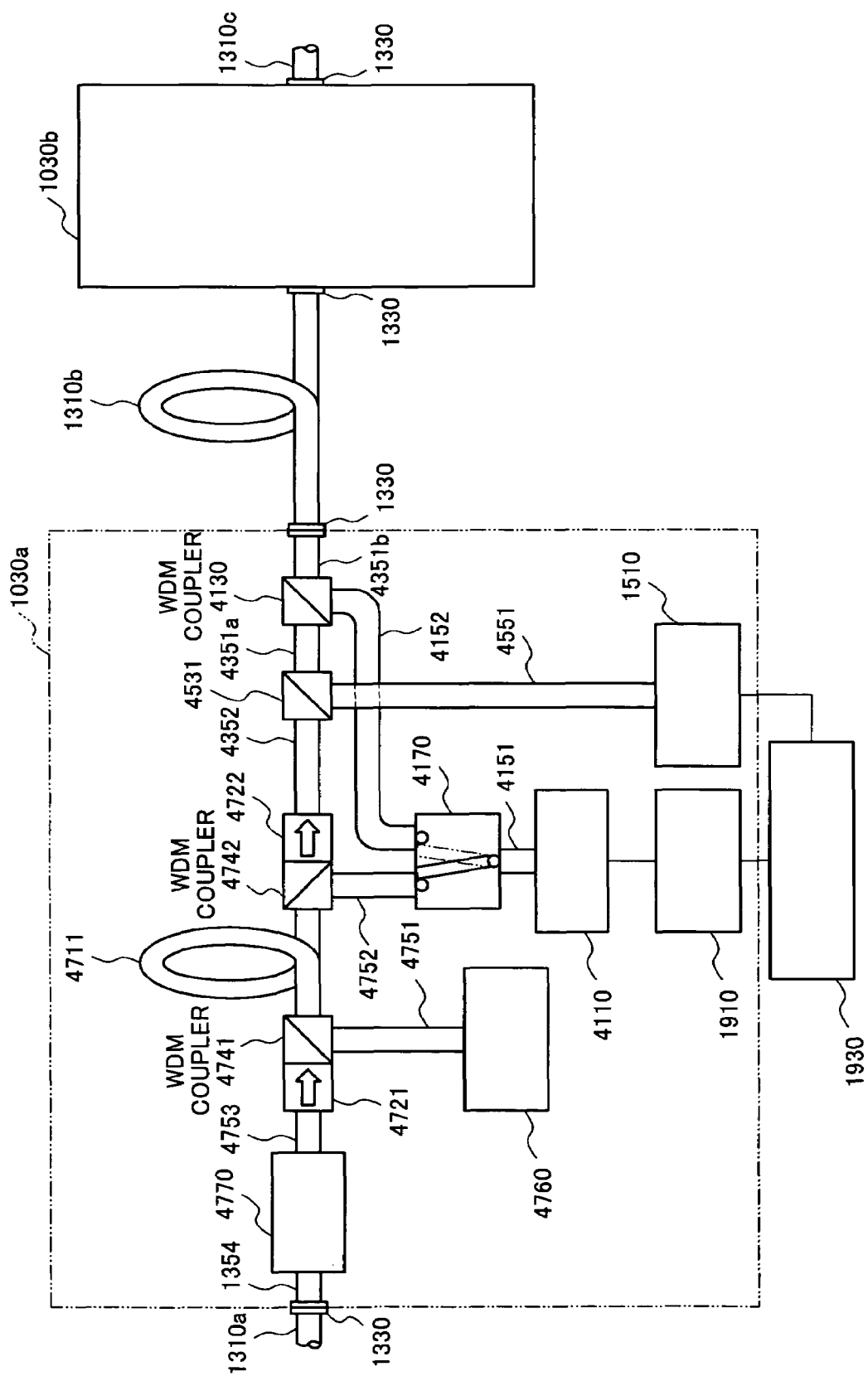
FIG. 8 is a schematic view showing a configuration of a signal light transmitting apparatus according to a fourth example.

FIG. 8 shows a configuration of a signal light transmitting apparatus according to a fourth example. The members that are designated by the same referential marks as designate the members of the first example have the same configurations as the members of the first example.

FIG. 8 shows part of the same configuration as shown in FIG. 2. A signal light power changer included in the signal light transmitting apparatus according to the fourth example includes a rare-earth-doped optical fiber amplifier which amplifies signal light. The rare-earth-doped optical fiber amplifier includes EDFA preferably. The rare-earth-doped optical fiber amplifier includes rare-earth-doped optical fiber 4711 through which signal light led to the rare-earth-doped optical fiber amplifier propagates, and amplification/scattering pump-light generator 4110 which generates pump light. A scattering pump light source included in the signal light transmitting apparatus according to the fourth example includes amplification/scattering pump-light generator 4110. The signal light transmitting apparatus according to the fourth example includes a rare-earth-doped/transmission optical-fiber selector which selectively leads the generated pump light into one of the rare-earth-doped optical fiber 4711 and the transmission optical fiber 1310b. The rare-earth-doped/transmission optical-fiber selector includes optical switch 4170.

Transmission optical fiber 1310a is connected to optical amplifier 4770 through optical connector 1330 and optical fiber 1354. Optical amplifier 4770 includes at least one rare-earth-doped optical fiber amplifier. Optical amplifier 4770 is connected to rare-earth-doped optical fiber 4711 through optical fiber 4753, optical isolator 4721, and WDM coupler 4741. Rare-earth-doped optical fiber 4711 is connected to transmission optical fiber 1310b through WDM coupler 4742, optical isolator 4722, optical fiber 4352, optical divider 4531, optical fiber 4351a, WDM coupler 4130, optical fiber 4351b, and optical connector 1330. WDM coupler 4741 is connected to amplification pump light generator 4760 through optical fiber 4751. Amplification pump light generator 4760 is included in the rare-earth-doped optical fiber amplifier. Optical switch 4170 is connected to WDM coupler 4742 through optical fiber 4752, is connected to WDM coupler 4130 through optical fiber 4152, and is connected to amplification/scattering pump-light generator 4110 through optical fiber 4151. Amplification/scattering pump-light generator 4110 is connected to exit signal light controller 1910. Optical divider 4531 is connected to scattered light power measure 1510 through optical fiber 4551. During transmission of signal light, the signal light transmitted by transmission optical fiber 1310a, is amplified by optical amplifier 4770, passes through optical isolator 4721, penetrates WDM coupler 4741, is amplified in rare-earth-doped optical fiber 4711, penetrates WDM coupler 4742, passes through optical isolator 4722, penetrates optical divider 4531 and WDM coupler 4130 as well as is transmitted to the next repeater office 1030b by transmission optical fiber 1310b.

When the optical switch 4170 leads the generated pump light into transmission optical fiber 1310b, scattered light is produced in transmission optical fiber 1310b.

When optical switch 4170 leads the generated pump light into rare-earth-doped optical fiber 4711, power of signal light which propagates through rare-earth-doped optical fiber 4711 is amplified.

Rare-earth-doped optical fiber 4711 included in the signal light power changer and the scattering pump light source include amplification/scattering pump-light generator 4110 in common. Accordingly, it is not necessary to prepare an additional light source which emits scattering pump light.

In the same way as the third example, the rare-earth-doped optical fiber amplifier includes the first reflected signal light power measure, and scattered light power measure 1510 can function as the first reflected signal light power measure. When rare-earth-doped optical fiber 4711 includes EDFA, the wavelength of the pump light which amplification/scattering pump-light generator 4110 generates ranges from about 1470 nm to about 1490 nm. The wavelength of the noise light which is produced when the pump light having such wavelength enters the transmission optical fiber is included in L-band.

When the rare-earth-doped optical fiber amplifier includes L-band EDFA, the signal light transmitting apparatus is set up so that scattered light power measure 1510 can measure the power of the light which has the wavelength included within L-band. Because the wavelength of the noise light to produce is included in L-band, scattered light power measure 1510 can measure noise light.

When rare-earth-doped optical fiber 4711 includes C-band EDFA, the signal light transmitting apparatus is set up so that scattered light power measure 1510 can measure the power of the light which has the wavelength included within C-band. In this case, scattered light power measure 1510 cannot efficiently measure the power of the noise light having the wavelength included in L-band. Therefore, signal light transmitting apparatus is set up so that scattered light power measure 1510 can measure the power of the light which has the wavelength included within C-band or L-band. When the signal light transmitting apparatus is set up in this way, it is required for the signal light transmitting apparatus not to transmit the signal light which has the wavelength included within L-band.

Utilizing above-mentioned increase in reflectance through stimulated Brillouin scattering, entrance power of signal light which enters the transmission optical fiber can be optimized. When value of entrance power of signal light increases gradually and reaches a certain value, the reflected light (scattered light) which is reflected in the transmission optical fiber can increase sharply. Such value can represent probability of non-linear optical effect occurring. During transmission of signal light, value of entrance power should be made less than such value by a certain amount.

Most of configurations of a signal light transmitting apparatus and a signal light transmitting system according to a fifth example, are the same as configurations of the signal light transmitting apparatus and the signal light transmitting system according to the first example shown in FIG. 1 and FIG. 2, respectively. The members that are designated by the same referential marks as designate the members of the first example have the same configurations as the members of the first example. The signal light transmitting apparatus according to the fifth example includes controller (5910, 5930) including exit signal light controller 5910 and targeted value setter 5930, instead of controller (1910, 1930) including exit signal light controller 1910 and targeted value setter 1930.

Figure 9:
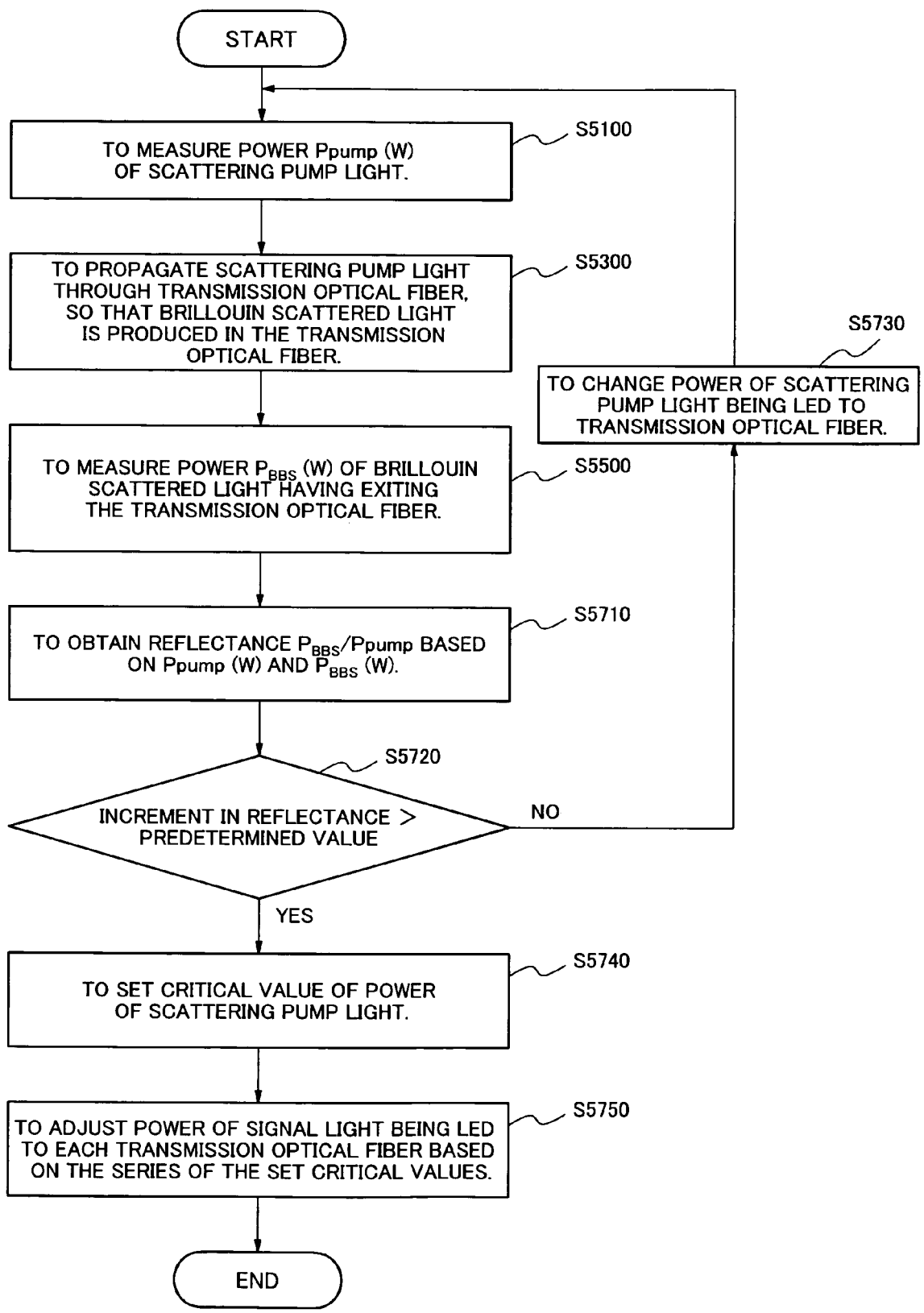
FIG. 9 is a flowchart of steps included in a signal light transmitting method according to a fifth example.

FIG. 9 shows steps included in a signal light transmitting method which the signal light transmitting apparatus utilizes. First, power $P_{pump}$ (W) of scattering pump light being led to the transmission optical fiber (transmission optical fiber 1310b in FIG. 1) is measured (scattering pump light power measuring step S5100). Scattering pump light is led to transmission optical fiber 1310b from scattering pump light generator 1110 in the same way as the first example (FIG. 1).

The led scattering pump light enters the transmission optical fiber at the signal light entrance end (signal light entrance end 1311b in FIG. 1). The entering scattering pump light propagates through the transmission optical fiber. During the propagation, Brillouin scattered light is produced in the transmission optical fiber (scattered light producing step S5300). Brillouin scattered light is included the scattered light produced in the transmission optical fiber.

Power $P_{BBS}$ (W) of Brillouin scattered light exiting signal light entrance end (signal light entrance end 1311b in FIG. 1) is measured (scattered light power measuring step S5500). Scattered light power measure 1510 measures power $P_{BBS}$ (W) of Brillouin scattered light.

Targeted value setter 5930 obtains reflectance $P_{BBS}/P_{pump}$ based on the measured power $P_{pump}$ (W) of the scattering pump light and the measured power $P_{BBS}$ (W) of the Brillouin scattered light (reflectance obtaining step S5710).

The signal light transmitting method includes a signal light adjusting step which adjusts power of signal light being led to the transmission optical fiber based on the obtained reflectance $P_{BBS}/P_{pump}$. The signal light adjusting step includes reflectance obtaining step S5710.

The signal light adjusting step further includes scattering pump light power changing step S5730 which changes power of scattering pump light being led to the transmission optical fiber. Targeted value setter 5930 operates so that scattering pump light power changing step S5730 is carried out.

When scattering pump light is led to the transmission optical fiber prior to scattering pump light power changing step S5730 (before power of scattering pump light is changed in scattering pump light power changing step S5730), scattering pump light power measuring step S5100, scattered light producing step S5300, scattered light power measuring step S5500, and reflectance obtaining step S5710 are carried out sequentially to obtain a prior reflectance. When scattering pump light is not led to the transmission optical fiber prior to scattering pump light power changing step S5730, a predetermined initial value has been assigned to the value of the prior reflectance. When scattering pump light is led to the transmission optical fiber posterior to scattering pump light power changing step S5730 (after power of scattering pump light is changed in scattering pump light power changing step S5730), scattering pump light power measuring step S5100, scattered light producing step S5300, scattered light power measuring step S5500, and reflectance obtaining step S5710 are carried out sequentially, to measure a posterior power of scattering pump light and obtain a posterior reflectance.

Targeted value setter 5930 determines whether increment by which reflectance increases from the prior reflectance to the posterior reflectance is greater than a predetermined value, or less than or equal to the predetermined value (reflectance determining step S5720).

Targeted value setter 5930 sets critical value of power of scattering pump light in which increase in reflectance begins (critical value setting step S5740). Targeted value setter 5930 sets critical value at the value of the measured posterior power of the scattering pump light, when it is determined that the increment in reflectance is greater than the predetermined value in the reflectance determining step S5720.

Critical values for transmission optical fibers included in the signal light transmitting system are set through the sequence of above-mentioned steps, respectively.

Targeted value setter 5930 and exit signal light controller 5910 adjust power of signal light being led to each transmission optical fiber based on the series of the set critical values (critical-value signal light adjusting step S5750).

When it is determined that the increment in reflectance is less than or equal to the predetermined value in reflectance determining step S5720, targeted value setter 5930 further changes power of scattering pump light being led to each transmission optical fiber. After further changing power of scattering pump light, the value of the obtained posterior reflectance replaces the value of the obtained prior reflectance as value of a new prior reflectance (scattering pump light power changing step S5730). Then scattering pump light power measuring step S5100, scattered light producing step S5300, scattered light power measuring step S5500, and reflectance obtaining step S5710 are sequentially carried out to obtain new posterior reflectance.

The signal light adjusting step includes reflectance obtaining step S5710, reflectance determining step S5720, scattering pump light power changing step S5730, critical value setting step S5740, and critical-value signal light-adjusting step S5750.

Figure 10:
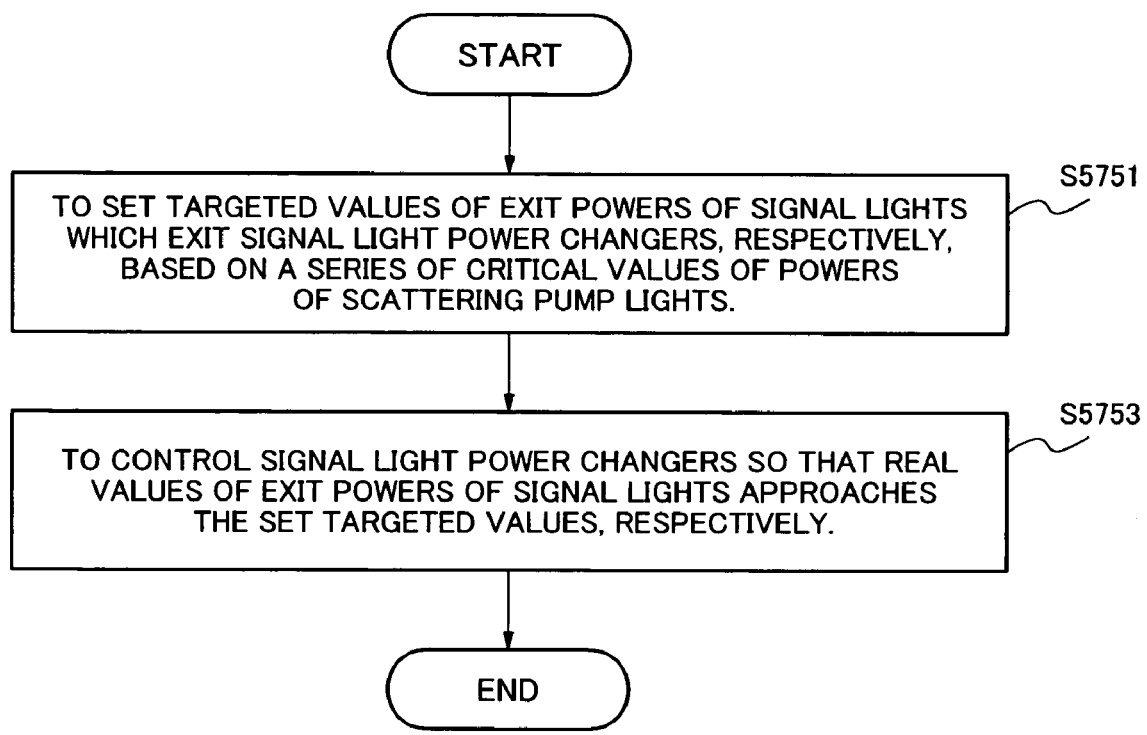
FIG. 10 is a flowchart of a critical-value signal light adjusting step included in the signal light transmitting method according to the fifth example.
Figure 11:
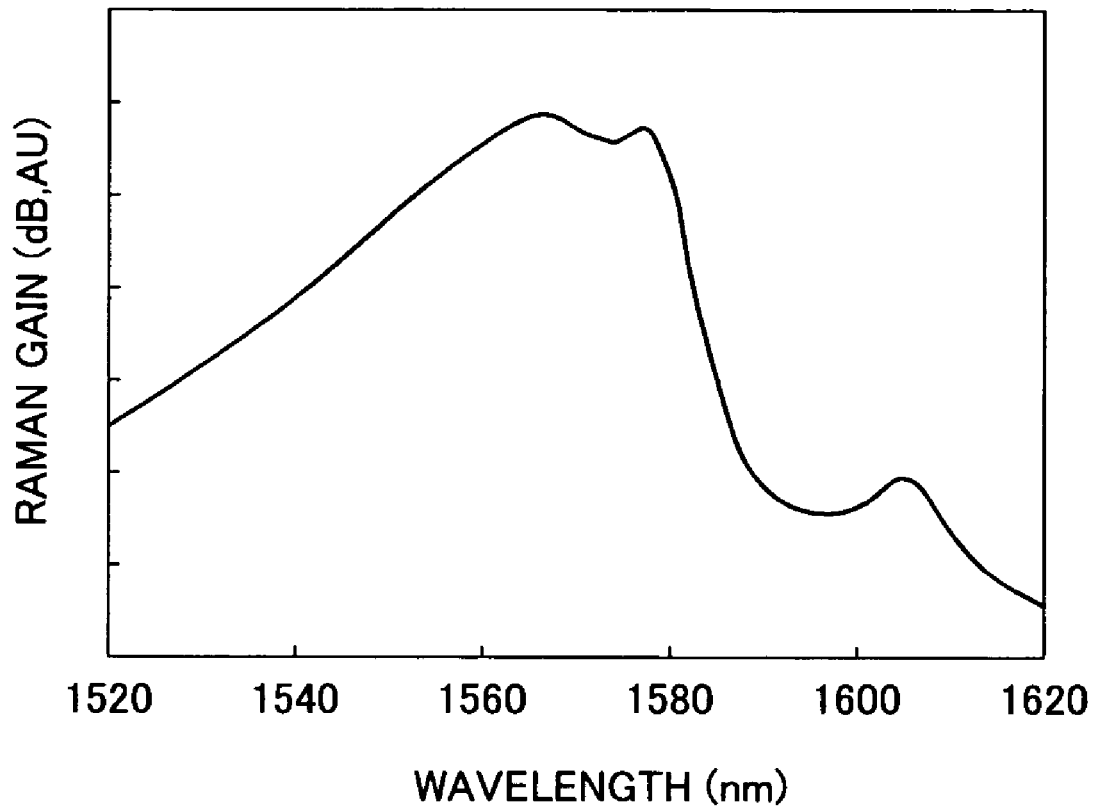
FIG. 11 is a typical Raman profile of an optical fiber made of silica glass.

FIG. 10 shows critical-value signal light adjusting step S5750. Critical-value signal light adjusting step S5750 includes targeted value setting step S5751 and exit signal light adjusting step S5753. Targeted value setter 5930 sets targeted values of powers of signal lights which exit signal light power changers included in the signal light transmitting system, respectively, based on the series of the set critical values (targeted value setting step S5751). Exit signal light controllers 5910 control the signal light power changers, respectively, so that values of real powers of signal lights which exit the signal light power changers approaches the set targeted values, respectively (exit signal light adjusting step S5753).

In the fifth example, a scattering pump light enters transmission optical fiber 1310b at signal light entrance end 1311b, and power of Brillouin scattered light which exits signal light entrance end 1311b is measured (FIG. 1). Scattering pump light may enter transmission optical fiber 1310b at signal light exit end 1312b, and power of Brillouin scattered light which exits signal light exit end 1312b may be measured. In this case, it is necessary to modify optical system of the signal light transmitting system.

Additional advantages and modifications will readily occur to those skilled in the art. Therefore, the invention in its broader aspects is not limited to the specific details shown and described herein. Accordingly, various modifications may be made without departing from the spirit or scope of the general invention concept as defined by the appended claims and their equivalents.

What is claimed is:

1. A signal light transmitting apparatus from which signal light is led into a transmission optical fiber, the transmission optical fiber transmitting the led signal light, comprising:
   a signal light power changer which changes power of signal light led thereto, the changed signal light being led into the transmission optical fiber therefrom;
   a scattering pump light source which emits scattering pump light producing scattered light in the transmission optical fiber;
   a scattered light power measure which measures the power of the produced scattered light; and
   a controller which controls the signal light power changer based on the measured power of the scattered light.

2. The signal light transmitting apparatus according to claim 1, wherein the scattered light produced in the transmission optical fiber includes noise light.

3. The signal light transmitting apparatus according to claim 2, wherein:
   the scattering pump light source can emit first scattering pump light and second scattering pump light having different power and the same wavelength, by turns;
   when the scattering pump light source emits first scattering pump light, first noise light is produced in the transmission optical fiber, exits the transmission optical fiber, and is led to the scattered light power measure, the scattered light power measure measuring the power NP1 of the led first noise light;

when the scattering pump light source emits second scattering pump light, second noise light is produced in the transmission optical fiber, exits the transmission optical fiber, and is led to the scattered light power measure, the scattered light power measure measuring the power NP2 of the led second noise light; and the controller controls the signal light power changer based on a difference (NP1−NP2) between the measured power NP1 of the first noise light and the measured power NP2 of the second noise light.

4. The signal light transmitting apparatus according to claim 3, wherein:

when first scattering pump light enters the transmission optical fiber, the transmission optical fiber can take a state of having first Raman gain G1;

when second scattering pump light enters the transmission optical fiber, the transmission optical fiber can take a state of having second Raman gain G2; and the controller obtains a difference (G1−G2) between first Raman gain G1 and second Raman gain G2 based on the difference (NP1−NP2) as well as controls the signal light power changer based on the obtained difference (G1−G2).

5. The signal light transmitting apparatus according to claim 4, further comprising a scattering pump light power measure which measures power $P_{pump}1$ of first scattering pump light and power $P_{pump}2$ of second scattering pump light, the scattering pump light source emitting first and second scattering pump light by turns, wherein the controller:

(i) obtains a noise light power variation $\Delta N \equiv (NP1-NP2)/(P_{pump}1-P_{pump}2)$ based on the measured power $P_{pump}1$ of the first scattering pump light, the measured power $P_{pump}2$ of the second scattering pump light, and the difference (NP1−NP2) which the controller obtains;

(ii) obtains Raman gain efficiency $\Gamma \equiv (G1-G2)/(P_{pump}1-P_{pump}2)$ based on the obtained noise light power variation $\Delta N$ and a predetermined formula $\Gamma = A*\Delta N + B$; as well as (iii) controls the signal light power changer based 6 on the obtained Raman gain efficiency $\Gamma$.

6. The signal light transmitting apparatus according to claim 5, wherein G1 and G2 are greater than or equal to 3 dB.

7. The signal light transmitting apparatus according to claim 1, wherein the signal light power changer includes a variable optical attenuator which attenuates power of signal light passing therethrough, and the controller controls the variable optical attenuator.

8. The signal light transmitting apparatus according to claim 1, wherein:

the signal light power changer includes an optical amplifier which amplifies power of signal light led to the signal light power changer;

the optical amplifier includes a reflected signal light power measure which measures power of signal light reflected in the transmission optical fiber; and the reflected signal light power measure can measure the power of the produced scattered light in the transmission optical fiber.

9. The signal light transmitting apparatus according to claim 1, wherein:

the signal light power changer includes an optical amplifier which amplifies power of signal light led to the signal light power changer;

the scattering pump light source includes a scattering pump light generator which generates scattering pump light;

the signal light transmitting apparatus further comprises a signal light/scattering pump light selector which leads one of signal light led to the signal light transmitting apparatus and scattering pump light generated with the scattering pump light generator, to the optical amplifier;

when the signal light/scattering pump light selector leads the generated scattering pump light to the optical amplifier, the optical amplifier amplifies the power of the led scattering pump light, the amplified scattering pump light being led into the transmission optical fiber; and when the signal light/scattering pump light selector leads signal light to the optical amplifier, the optical amplifier amplifies power of the led signal light, the amplified signal light being led into the transmission optical fiber.

10. The signal light transmitting apparatus according to claim 9, wherein the optical amplifier includes a rare-earth-doped optical fiber amplifier.

11. The signal light transmitting apparatus according to claim 1, wherein:

the scattering pump light source includes a rare-earth-doped optical fiber amplifier which amplifies power of signal light led thereto, the amplified signal light being led into the transmission optical fiber; and amplified spontaneous emission light which the rare-earth-doped optical fiber amplifier emits produces scattered light in the transmission optical fiber.

12. The signal light transmitting apparatus according to claim 1, further comprising a rare-earth-doped optical fiber amplifier, wherein:

the rare-earth-doped optical fiber amplifier includes a rare-earth-doped optical fiber through which signal light led to the rare-earth-doped optical fiber amplifier propagates, and an amplification/scattering pump-light generator which generates pump light;

the signal light transmitting apparatus further comprises a rare-earth-doped/transmission optical-fiber selector which leads the generated pump light into one of the rare-earth-doped optical fiber and the transmission optical fiber;

when the rare-earth-doped/transmission optical-fiber selector leads the generated pump light into the transmission optical fiber, scattered light is produced in the transmission optical fiber; and when the rare-earth-doped/transmission optical-fiber selector leads the generated pump light into the rare-earth-doped optical fiber, power of signal light which propagates through the rare-earth-doped optical fiber is amplified.

13. The signal light transmitting apparatus according to claim 1, the transmission optical fiber including a signal light entrance end and a signal light exit end, signal light entering the transmission optical fiber at the signal light entrance end from the apparatus, and the transmission optical fiber transmitting the entering signal light from the signal light entrance end to the signal light exit end, wherein:

the signal light power changer changes power of signal light, the changed signal light entering the transmission optical fiber at the signal light entrance end;

scattering pump light which the scattering pump light source emits, enters the transmission optical fiber at at least one of the signal light entrance end and the signal light exit end to produce scattered light in the transmission optical fiber;

the produced scattered light exits the transmission optical fiber at the signal light entrance end and the signal light exit end; and the produced scattered light is led to the scattered light power measure from at least one of the signal light entrance end and the signal light exit end.

14. The signal light transmitting apparatus according to claim 13, wherein the scattering pump light source and the scattered light power measure are arranged on the signal light entrance end side of the transmission optical fiber.

15. The signal light transmitting apparatus according to claim 13, wherein the scattered light produced in the transmission optical fiber includes Brillouin scattered light.

16. The signal light transmitting apparatus according to claim 15, further comprising a scattering pump light power measure which measures power $P_{pump}$ of scattering pump light emitted by the scattering pump light source, wherein the controller:

obtains a reflectance $P_{BBS}/P_{pump}$ based on the measured power $P_{pump}$ of the scattering pump light and power $P_{BBS}$ of Brillouin scattered light which the scattered light power measure measures; and controls the signal light power changer based on the obtained reflectance $P_{BBS}/P_{pump}$.

17. A signal light transmitting method comprising:

a scattered light producing step of propagating scattering pump light through a transmission optical fiber which transmits signal light, so that scattered light is produced in the transmission optical fiber;

a scattered light power measuring step of measuring the power of the produced scattered light; and a signal light adjusting step of adjusting power of signal light being led into the transmission optical fiber based on the measured power of the scattered light.

18. The signal light transmitting method according to claim 17, wherein noise light is produced in the transmission optical fiber, in the scattered light producing step.

19. The signal light transmitting method according to claim 18, further comprising:

a first scattering pump light power measuring step of measuring power $P_{pump}1$ of first scattering pump light being led to the transmission optical fiber; and a second scattering pump light power measuring step of measuring power $P_{pump}2$ of second scattering pump light being led to the transmission optical fiber, the first and second scattering pump light having different power and the same wavelength, wherein:

the scattered light producing step includes a first noise light producing step of propagating first scattering pump light through the transmission optical fiber, so that first noise light is produced in the transmission optical fiber, and a second noise light producing step of propagating second scattering pump light through the transmission optical fiber, so that second noise light is produced in the transmission optical fiber;

the scattered light power measuring step includes a first noise light power measuring step of measuring the power NP1 of the produced first noise light, and a second noise light power measuring step of measuring the power NP2 of the produced second noise light;

when first scattering pump light enters the transmission optical fiber, the transmission optical fiber can take a state of having first Raman gain G1;

when second scattering pump light enters the transmission optical fiber, the transmission optical fiber can take a state of having second Raman gain G2; as well as the signal light adjusting step includes (I)

a noise light power variation obtaining step of obtaining a noise light power variation $\Delta N \equiv (NP1-NP2)/(P_{pump}1-P_{pump}2)$ based on the measured power $P_{pump}1$ of the first scattering pump light, the measured power $P_{pump}2$ of the second scattering pump light, the measured power NP1 of the first noise light, and the measured power NP2 of the second noise light, (II)

a Raman gain efficiency obtaining step of obtaining Raman gain efficiency $\Gamma \equiv (G1-G2)/(P_{pump}1-P_{pump}2)$ based on the obtained noise light power variation $\Delta N$ and a predetermined formula $\Gamma = A*\Delta N + B$, as well as (III)

a Raman-gain-efficiency signal light adjusting step of adjusting power of signal light being led to the transmission optical fiber based on the obtained Raman gain efficiency $\Gamma$.

20. The signal light transmitting method according to claim 17, wherein Brillouin scattered light is produced in the transmission optical fiber, in the scattered light producing step.

21. The signal light transmitting method according to claim 20, further comprising a scattering pump light power measuring step of measuring power $P_{pump}$ of scattering pump light being led to the transmission optical fiber, wherein:

in the scattered light producing step, the scattering pump light led to the transmission optical fiber including ends enters the fiber at one end and propagates therethrough to produce Brillouin scattered light therein;

in the scattered light power measuring step, the power $P_{BBS}$ of the Brillouin scattered light, which is produced in the transmission optical fiber and exits the fiber at the one end, is measured;

the signal light adjusting step includes a reflectance obtaining step of obtaining a reflectance $P_{BBS}/P_{pump}$ based on the measured power $P_{pump}$ the scattering pump light and the measured power $P_{BBS}$ of the Brillouin scattered light; as well as in the signal light adjusting step, power of signal light being led to the transmission optical fiber is adjusted based on the obtained reflectance $P_{BBS}/P_{pump}$.

22. The signal light transmitting method according to claim 21, wherein:

the signal light adjusting step further comprises a scattering pump light power changing step of changing power of scattering pump light being led to the transmission optical fiber;

the scattering pump light power measuring step, the scattered light producing step, the scattered light power measuring step, and the reflectance obtaining step are carried out to obtain a prior reflectance, prior to the scattering pump light power changing step;

the scattering pump light power measuring step, the scattered light producing step, the scattered light power measuring step, and the reflectance obtaining step are carried out to measure a posterior power of scattering pump light and obtain a posterior reflectance, posterior to the scattering pump light power changing step;

the signal light adjusting step includes
- a reflectance determining step of determining whether increment by which reflectance increases from the prior reflectance to the posterior reflectance is greater than a predetermined value, or less than or equal to the predetermined value,
- a critical value setting step of setting a critical value at the value of the measured posterior power of the scattering pump light, when it is determined that the increment in reflectance is greater than the predetermined value in the reflectance determining step, and
- a critical-value signal light adjusting step of adjusting power of signal light being led to the transmission optical fiber based on the set critical value; as well as when it is determined that the increment in reflectance is less than or equal to the predetermined value in the reflectance determining step, the scattering pump light power changing step is carried out to further change power of scattering pump light being led to the transmission optical fiber.

23. A signal light transmitting system comprising:

a plurality of sets including a transmission optical fiber and the signal light transmitting apparatus according to claim 1, signal light being led from the apparatus into the fiber, which sequentially transmit signal light; and a targeted value setter which sets targeted value of power of signal light which exit at least one of the signal light power changers included in the sets based on power of scattered light which at least one of the scattered light power measures included in the sets measures, wherein the controller which controls the signal light power changer includes a exit signal light controller, and the exit signal light controller controls the signal light power changer so that value of power of signal light which exits the signal light power changer approaches the set targeted value.

* * * * *